United States Patent [19]
Inoue

[11] Patent Number: 6,011,761
[45] Date of Patent: Jan. 4, 2000

[54] DOWNLOADING COMPRESSED AUDIO DATA FROM A SERVER AND DETECTING RECORDING INHIBITING INFORMATION

[75] Inventor: Hiraku Inoue, Kanagawa, Japan

[73] Assignee: Sony Corporation, Tokyo, Japan

[21] Appl. No.: 09/099,870

[22] Filed: Jun. 19, 1998

[30] Foreign Application Priority Data

Jun. 20, 1997 [JP] Japan ................................. 9-164723
Nov. 18, 1997 [JP] Japan ................................. 9-317435

[51] Int. Cl.⁷ ........................................................ G11B 17/22
[52] U.S. Cl. ............................ 369/32; 369/47; 369/84; 386/94; 395/200.49; 395/500
[58] Field of Search ................................. 369/32, 84, 47, 369/54, 83, 94; 386/94, 83, 93; 380/5, 6, 15, 20; 455/45, 66; 704/500; 395/200.49, 200.61

[56] References Cited

U.S. PATENT DOCUMENTS

| | | | |
|---|---|---|---|
| 5,272,576 | 12/1993 | Ohtsuka | 360/60 |
| 5,539,635 | 7/1996 | Larson, Jr. | 364/479.04 |
| 5,625,610 | 4/1997 | Hiranuma | 369/47 |
| 5,668,873 | 9/1997 | Yamauchi | 380/5 |
| 5,703,859 | 12/1997 | Tahara et al. | 369/84 |
| 5,734,961 | 3/1998 | Castille | 455/5.1 |
| 5,778,064 | 7/1998 | Kori et al. | 380/5 |
| 5,793,980 | 8/1998 | Glaser et al. | 395/200.61 |
| 5,799,081 | 8/1998 | Kim et al. | 380/5 |
| 5,812,937 | 9/1998 | Takahisa et al. | 455/66 |
| 5,825,968 | 10/1998 | Nishigaki et al. | 369/83 |
| 5,859,815 | 1/1999 | Inoue et al. | 369/32 |
| 5,862,104 | 1/1999 | Matsumoto | 369/84 |
| 5,870,710 | 2/1999 | Ozawa et al. | 704/500 |

*Primary Examiner*—Ali Neyzari
*Assistant Examiner*—Kim-Kwok Chu
*Attorney, Agent, or Firm*—Jay H. Maioli

[57] ABSTRACT

A transmission system for transmitting compressed audio data selected by a user from compressed audio data stored in a server to a client located remote from the server. If the state of the recording medium loaded on the client side is normal and/or the money deposited on the client side is sufficient to permit charging the user, the selected compressed audio data starts to be transmitted from the server. If the state of the recording medium loaded on the client side is not normal and/or the money deposited on the client side is insufficient to permit charging the user, transmission of the selected compressed audio data from the server is inhibited. This prevents incorrectly billing the client.

12 Claims, 19 Drawing Sheets

|  | 16BITS || 16BITS ||
|---|---|---|---|---|
|  | MSB　　　LSB | MSB　　　LSB | MSB　　　LSB | MSB　　　LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | CLUSTER H | CLUSTER L | 00000000 | 00000010 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | MAKER CODE | MODEL CODE | FIRST TNO | LAST TNO |
| 8 | 00000000 | 00000000 | 00000000 | USED SECTORS |
| 9 | 00000000 | 00000000 | 00000000 | 00000000 |
| 10 | 00000000 | 00000000 | 00000000 | DISC SERIAL NO |
| 11 | DISC | ID | P-DFA | P-EMPTY |
| 12 | P-FRA | P-TNO1 | P-TNO2 | P-TNO3 |
| 13 | P-TNO4 | P-TNO5 | P-TNO6 | P-TNO7 |
| 74 | P-TNO248 | P-TNO249 | P-TNO250 | P-TNO251 |
| 75 | P-TNO252 | P-TNO253 | P-TNO254 | P-TNO255 |
| 76 | 00000000 | 00000000 | 00000000 | 00000000 |
| 77 | 00000000 | 00000000 | 00000000 | 00000000 |
| 78 | START ADDRES ||| TRACK MODE |
| 79 | END ADDRESS ||| LINK INFORMATION |
| 80 | START ADDRES ||| TRACK MODE |
| 81 | END ADDRESS ||| LINK INFORMATION |
| 82 | START ADDRES ||| TRACK MODE |
| 83 | END ADDRESS ||| LINK INFORMATION |
| 580 | START ADDRES ||| TRACK MODE |
| 581 | END ADDRESS ||| LINK INFORMATION |
| 582 | START ADDRES ||| TRACK MODE |
| 583 | END ADDRESS ||| LINK INFORMATION |
| 584 | START ADDRES ||| TRACK MODE |
| 585 | END ADDRESS ||| LINK INFORMATION |
| 586 | START ADDRES ||| TRACK MODE |
| 587 | END ADDRESS ||| LINK INFORMATION |

FIG.4

|   | 16BITS | | 16BITS | |
|---|---|---|---|---|
|   | MSB         LSB | MSB         LSB | MSB         LSB | MSB         LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | CLUSTER H | CLUSTER L | 00000000 | 00000010 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TNA1 | P-TNA2 | P-TNA3 |
| 13 | P-TNA4 | P-TNA5 | P-TNA6 | P-TNA7 |
| 74 | P-TNA248 | P-TNA249 | P-TNA250 | P-TNA251 |
| 75 | P-TNA252 | P-TNA253 | P-TNA254 | P-TNA255 |
| 76 | DISC NAME | | | |
| 77 | DISC NAME | | LINK INFORMATION | |
| 78 | DISC NAME/TRACK NAME | | | |
| 79 | DISC NAME/TRACK NAME | | LINK INFORMATION | |
| 80 | DISC NAME/TRACK NAME | | | |
| 81 | DISC NAME/TRACK NAME | | LINK INFORMATION | |
| 82 | DISC NAME/TRACK NAME | | | |
| 83 | DISC NAME/TRACK NAME | | LINK INFORMATION | |
| 584 | DISC NAME/TRACK NAME | | | |
| 585 | DISC NAME/TRACK NAME | | LINK INFORMATION | |
| 586 | DISC NAME/TRACK NAME | | | |
| 587 | DISC NAME/TRACK NAME | | LINK INFORMATION | |

FIG.8

|   | 16BITS | | 16BITS | |
|---|---|---|---|---|
|   | MSB　　　LSB | MSB　　　LSB | MSB　　　LSB | MSB　　　LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | CLUSTER H | CLUSTER L | 00000000 | 00000000 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TRD1 | P-TRD2 | P-TRD3 |
| 13 | P-TRD4 | P-TRD5 | P-TRD6 | P-TRD7 |
| 14 | P-TRD8 | P-TRD9 | P-TRD10 | P-TRD11 |
| 15 | P-TRD12 | P-TRD13 | P-TRD14 | P-TRD15 |
| 16 | P-TRD16 | | | |
| 17 | | | | |
| 73 | | | | |
| 74 | P-TRD248 | P-TRD249 | P-TRD250 | P-TRD251 |
| 75 | P-TRD252 | P-TRD253 | P-TRD254 | P-TRD255 |
| 76 | RECORDING DATE AND TIME | | | |
| 77 | | | MAKER CODE | MODEL CODE |
| 78 | RECORDING DATE AND TIME | | | |
| 79 | | | MAKER CODE | MODEL CODE |
| 80 | RECORDING DATE AND TIME | | | |
| 81 | | | MAKER CODE | MODEL CODE |
| 82 | RECORDING DATE AND TIME | | | |
| 83 | | | MAKER CODE | MODEL CODE |
| 84 | RECORDING DATE AND TIME | | | |
| 85 | | | | LINK INFORMATION |
| 86 | | | | |
| 586 | RECORDING DATE AND TIME | | | |
| 587 | | | | LINK INFORMATION |

FIG.9

|   | 16BITS | | 16BITS | |
|---|---|---|---|---|
|   | MSB        LSB | MSB        LSB | MSB        LSB | MSB        LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | CLUSTER H | CLUSTER L | 00000000 | 00000000 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TNA1 | P-TNA2 | P-TNA3 |
| 13 | P-TNA4 | P-TNA5 | P-TNA6 | P-TNA7 |
| 14 | P-TNA8 | P-TNA9 | P-TNA10 | P-TNA11 |
| 15 | P-TNA12 | P-TNA13 | P-TNA14 | P-TNA15 |
| 16 | P-TNA16 | | | |
| 17 | | | | |
| 73 | | | | |
| 74 | P-TNA248 | P-TNA249 | P-TNA250 | P-TNA251 |
| 75 | P-TNA252 | P-TNA253 | P-TNA254 | P-TNA255 |
| 76 | DISC NAME | | | |
| 77 | DISC NAME | | LINK INFORMATION | |
| 78 | DISC NAME OR TRACK NAME | | | |
| 79 | DISC NAME OR TRACK NAME | | LINK INFORMATION | |
| 80 | DISC NAME OR TRACK NAME | | | |
| 81 | DISC NAME OR TRACK NAME | | LINK INFORMATION | |
| 82 | DISC NAME OR TRACK NAME | | | |
| 83 | DISC NAME OR TRACK NAME | | LINK INFORMATION | |
| 84 | DISC NAME OR TRACK NAME | | | |
| 85 | DISC NAME OR TRACK NAME | | LINK INFORMATION | |
| 86 | DISC NAME OR TRACK NAME | | | |
| 586 | DISC NAME OR TRACK NAME | | | |
| 587 | DISC NAME OR TRACK NAME | | LINK INFORMATION | |

FIG.10

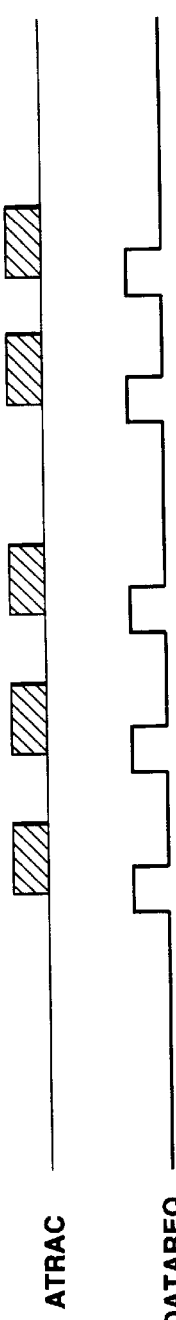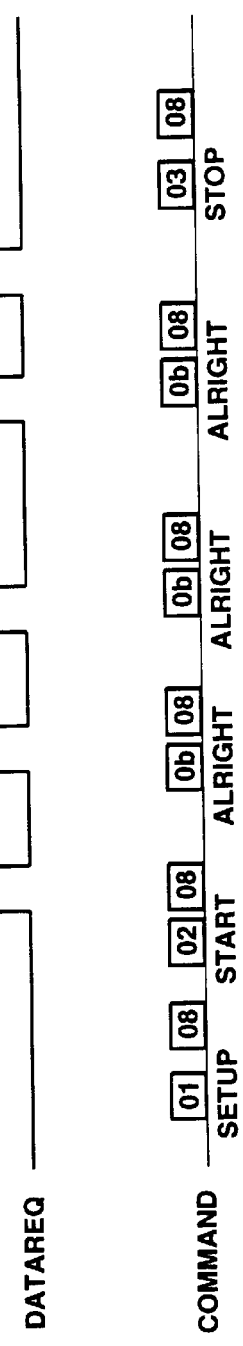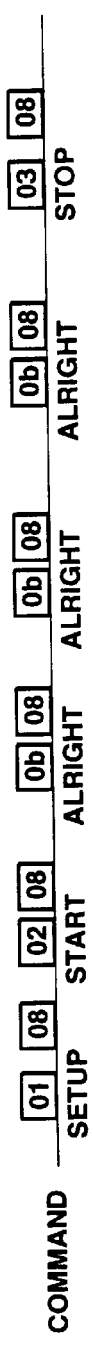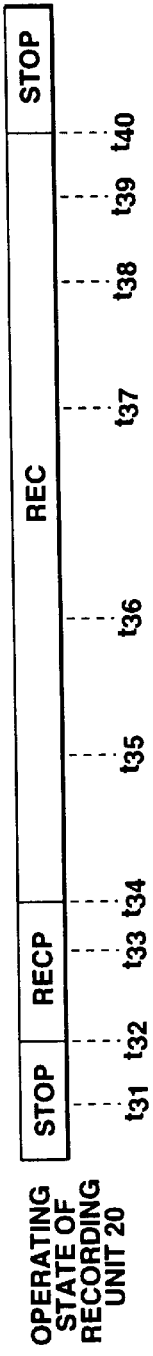

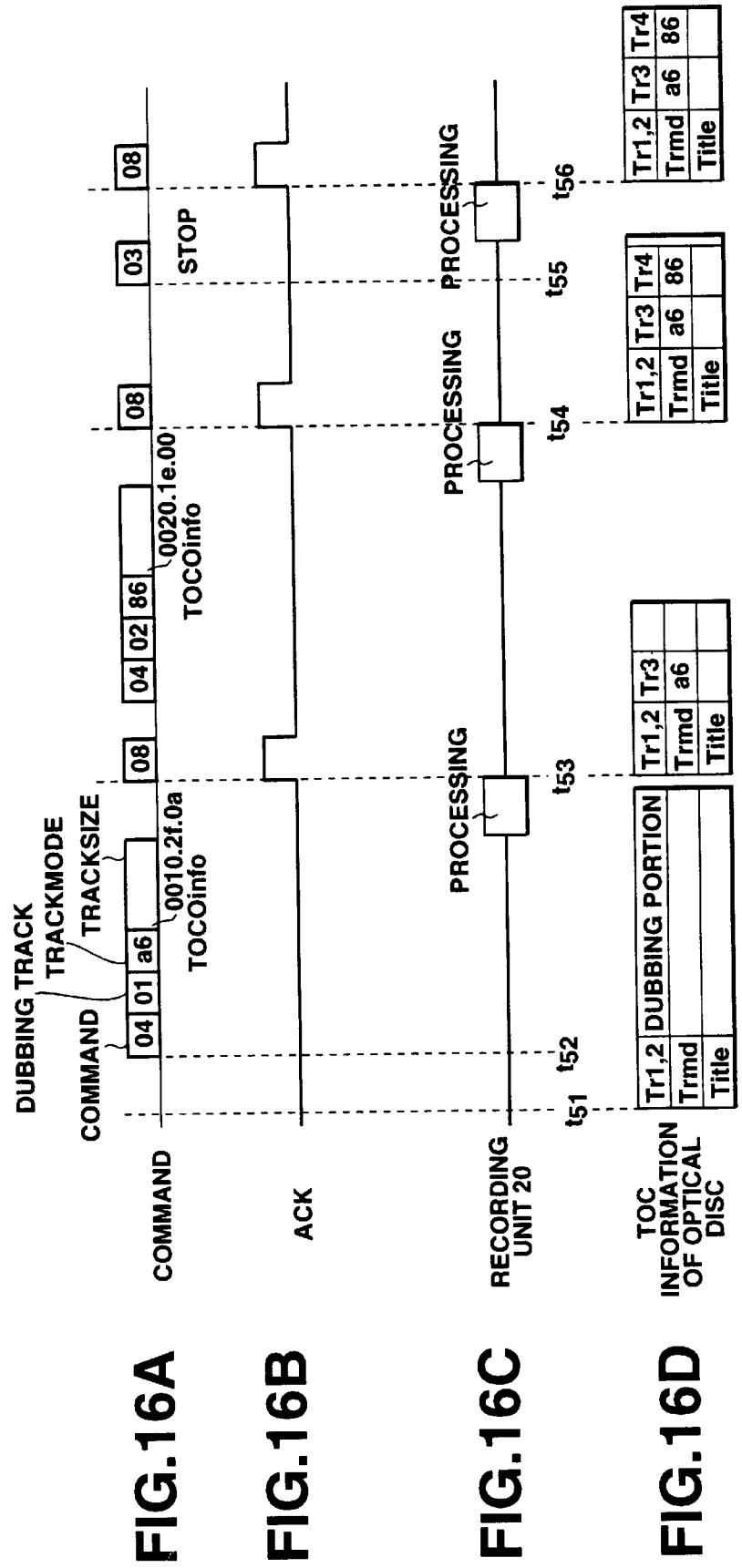

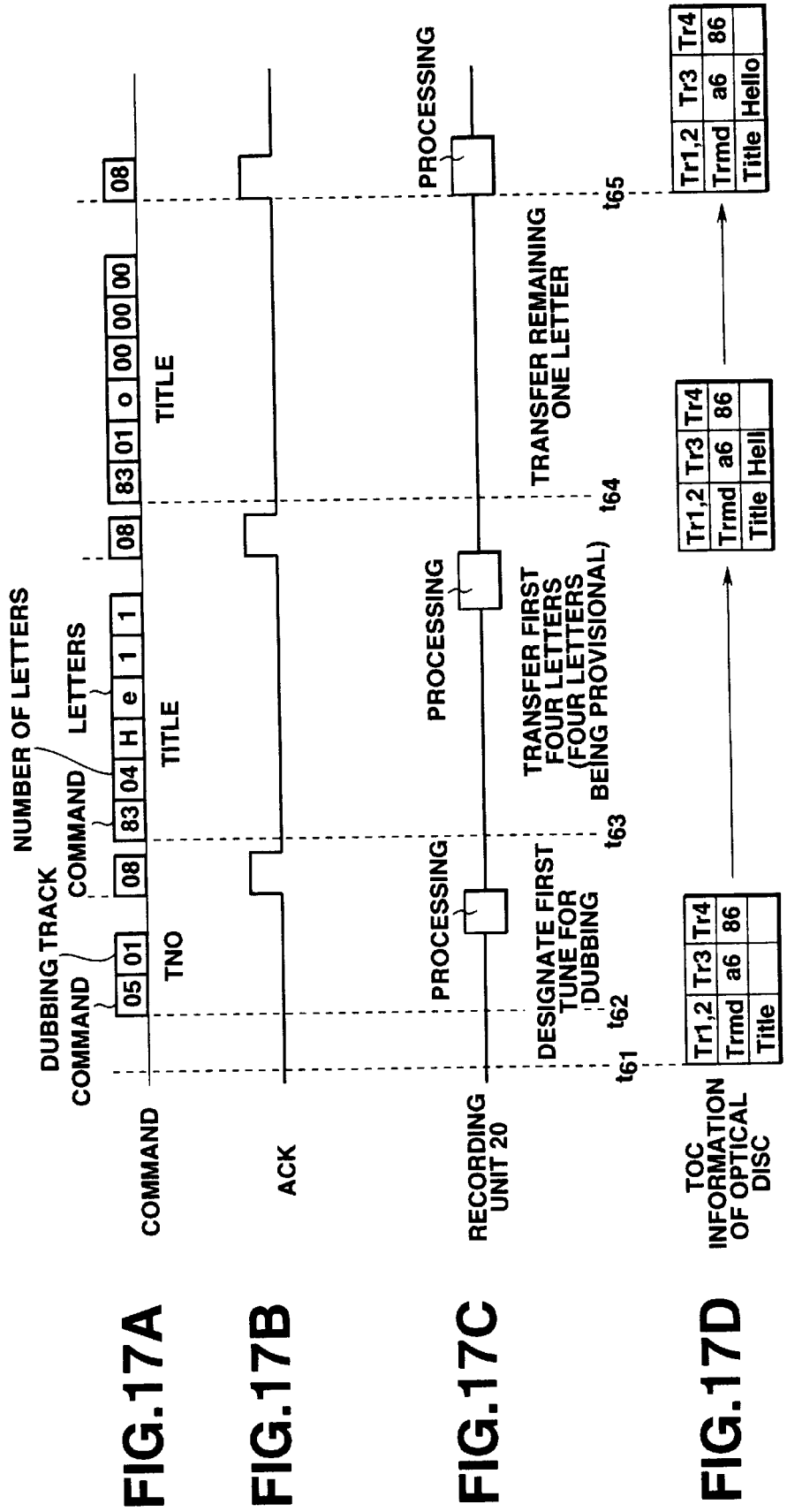

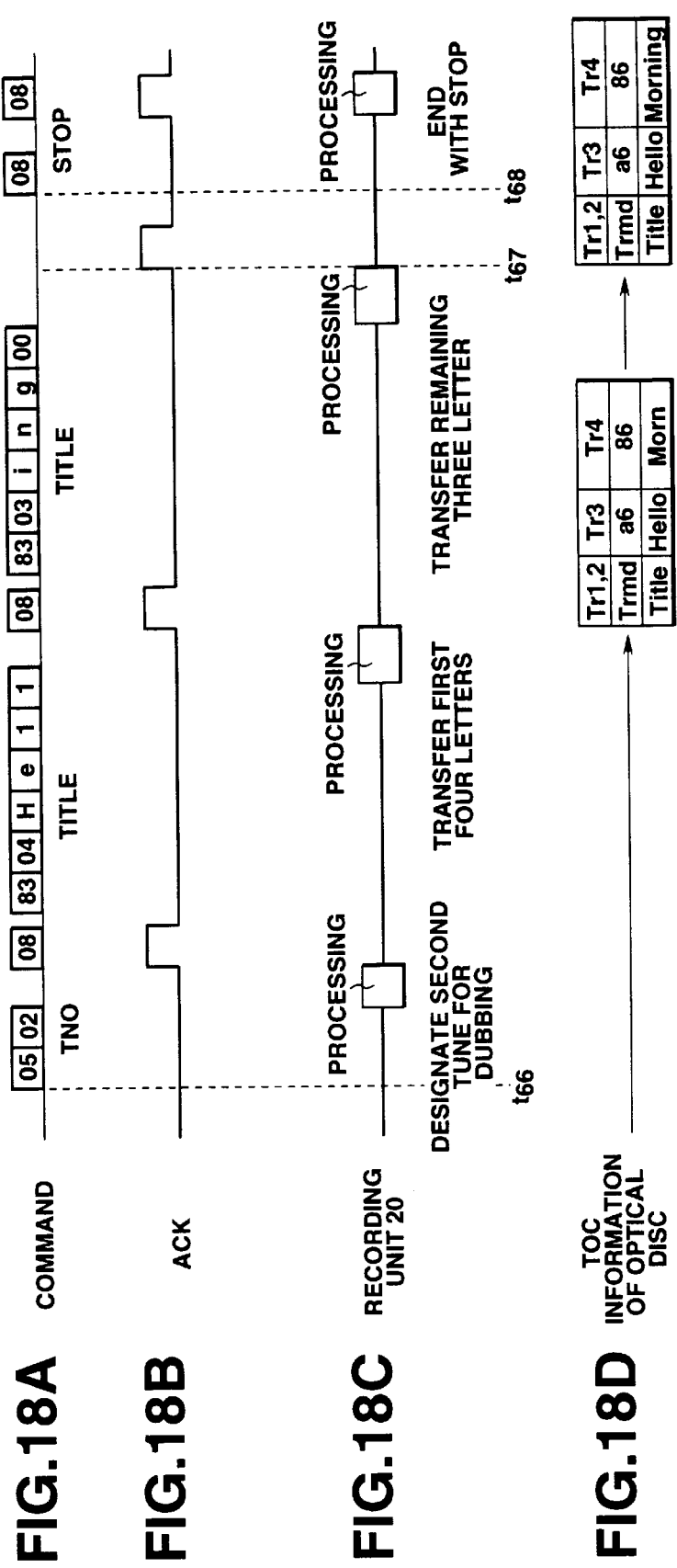

| TNO | TITLE | TRMD | TRACKSIZE |
|-----|---------|------|------------|
| Tr1 | EMOTION | e6   | 0011.05.02 |
| Tr2 | DREAM   | e6   | 0022.1f.0a |
| Tr3 | HELLO   | a6   | 0010.2f.0a |
| Tr4 | MORNING | 86   | 0020.1e.00 |

FIG.19

DOWNLOADING COMPRESSED AUDIO DATA FROM A SERVER AND DETECTING RECORDING INHIBITING INFORMATION

BACKGROUND OF THE INVENTION

Field of the Invention

This invention relates to a method and a system for transmitting compressed audio data without expansion and for recording the data on the receiving side as compressed signals in which the status of a recording medium is detected for announcing an error and displaying an error message.

There has so far been known a magneto-optical disc, termed a mini-disc (trademark), which is a recordable and reproducible disc-shaped recording medium of approximately 64 mm in diameter housed within a cartridge. This magneto-optical disc can record stereo audio signals continuing for about 74 minutes in accordance with the Adaptive Transform Acoustic Coding (ATRAC) system. This magneto-optical disc can duplicate audio data because it can record the information in distinction from the conventional digital audio disc known as a compact disc (trademark).

Similarly to the conventional digital audio disc, the magneto-optical disc permits random accessing to the audio data recorded thereon, because an area for Table-Of-Contents information (TOC information) for supervising the recorded audio data is provided in this magneto-optical disc in addition to an area for recording audio data. Therefore, if audio data is overwritten on the magneto-optical disc carrying recorded audio data, it is possible to erase or edit musical titles by rewriting the TOC information without erasing actual audio data.

There may be envisaged an audio dubbing system in which, for recording audio data compressed to approximately ⅕ on a magneto-optical disc, compressed audio data are directly stored in a server and read out therefrom so as to be recorded on a server side hard disc, and in which the compressed audio data are transmitted without expansion for recording on the receiving side.

It may be feared that if, in such audio dubbing system, the recording capacity of a magneto-optical disc is short, the recording area is destroyed partially or entirely, a replay-only disc is inserted or a mistaken recording inhibiting pawl provided in a cartridge of the magneto-optical disc is locked, the recording operation is not performed as regularly. This defective state can, however, be repaired if, when the user dubs the data from the compact disc to the magneto-optical disc, the status of the loaded magneto-optical disc is detected in the recording device to issue an alarm, since the user can then halt and re-initiate the dubbing operation even if the transmission of audio data from the compact disc is already started.

On the other hand, in an audio dubbing system in which the audio data transmitted from the server present in a remote place over a transmission route, if the user once requests a desired musical title, the server transmits the audio data without regard to the status of the recording medium owned by the client.

If the user inadvertently loads the replay-only disc on the recording device, the audio data transmitted cannot be recorded on the replay-only disc, such that the audio data transmitted cannot be dubbed on the client side.

Since the server charges the fee for the transmitted audio data, there is incurred monetary loss to the user.

Moreover, since the transmitted audio data is in the form of non-decoded compressed data, the user cannot tentatively hear the audio data, such that the transmitted audio data is of no avail to the user.

SUMMARY OF THE INVENTION

It is an object of the present invention to provide a dubbing system in which meaningless charging can be evaded and in which the status of the loaded recording medium is detected on the side of the recording device, such that, if the detected state is good or bad, delivery of the audio data is or is not requested to the server, respectively.

It is another object of the present invention to provide a dubbing system in which the rest of money deposited on the recording device, such as rest of coin inserted or a pre-paid card inserted on the recording device side, is detected and, if the detected state is good or bad, request for delivery of audio data is or is not made to the server side, respectively.

In one aspect, the present invention provides a transmitting/receiving system including a transmitter and a receiver, in which the transmitter has memory means for storing plural compressed data and transmitting means for transmitting compressed data selected by a user, and in which the receiver has receiver means for receiving the compressed data transmitted from the transmitter, recording means for recording the compressed data on a recording medium, detection means for detecting the recording inhibiting information of the recording medium, display means for displaying an error message in order to advise the user of the recording inhibition responsive to detection by the detection means and transmitting means for transmitting the request information to the transmitter as to if the recording medium is normal responsive to the detection result by the detection means.

In another aspect, the present invention provides a data transmitting/receiving method including the steps of detecting the recording inhibiting information of a recording medium, displaying an error message for advising the user of the effect of recording inhibition depending on the result of detection, transmitting means for transmitting the request information to a server if the recording medium is normal in accordance with the detected result, receiving the compressed data transmitted from the server and recording the compressed data on the recording medium.

With the audio data recording method and apparatus according to the present invention, an error message is displayed on the display means if audio data cannot be recorded as regularly. This enables display as to whether or not recording can be made correctly before recording on the recording medium to enable audio data to be recorded reliably. Also, with the present audio data recording method and apparatus, since the error message is displayed, the user can accommodate the contents of the error.

BRIEF DESCRIPTION OF THE DRAWINGS

FIG. 4 shows the data structure for a U-TOC sector 0 which is a management area on a magneto-optical disc embodying the present invention.

FIG. 8 shows a data structure for a U-TOC sector 1 which is a management area on a magneto-optical disc embodying the present invention.

FIG. 9 shows a data structure for a U-TOC sector 2 which is a management area on a magneto-optical disc embodying the present invention.

FIG. 10 shows a data structure for a U-TOC sector 4 which is a management area on a magneto-optical disc embodying the present invention.

FIG. 15A is a timing chart for compressed audio data ATRAC sent from the audio transferring unit 10 to the recording unit 20.

FIG. 15B is a timing chart of a request signal DATA Req sent from the recording unit 20 to the audio transferring unit 10.

FIG. 15C is a timing chart for illustrating a command signal Command sent from the audio transferring unit 10 to the recording unit 20.

FIG. 15D is a timing chart for illustrating an acknowledgment signal ACK sent from the recording unit 20 to the audio transferring unit 10.

FIG. 15E is a timing chart for illustrating the timing of processing on the recording unit.

FIG. 16A is a timing chart for illustrating a command signal Command sent from the audio transferring unit 10 to the recording unit 20.

FIG. 16B is a timing chart for illustrating an acknowledgment signal ACK sent from the recording unit 20 to the audio transferring unit 10.

FIG. 16C is a timing chart for illustrating the timing of processing on the recording unit.

FIG. 16D is a diagrammatic view showing the contents of the management information TOC formed on the optical disc D.

FIG. 17A is a timing chart for illustrating a command signal Command sent from the audio transferring unit 10 to the recording unit 20.

FIG. 17B is a timing chart for illustrating an acknowledgment signal ACK sent from the recording unit 20 to the audio transferring unit 10.

FIG. 17C is a timing chart for illustrating the timing of processing on the recording unit.

FIG. 17D is a diagrammatic view showing the contents of the management information TOC formed on the optical disc D.

FIG. 18A is a timing chart for illustrating a command signal Command sent from the audio transferring unit 10 to the recording unit 20.

FIG. 18B is a timing chart for illustrating an acknowledgment signal ACK sent from the recording unit 20 to the audio transferring unit 10.

FIG. 18C is a timing chart for illustrating the timing of processing on the recording unit.

FIG. 18D is a diagrammatic view showing the contents of the management information TOC formed on the optical disc D.

FIG. 19 illustrates the contents recorded on the optical disc D.

DESCRIPTION OF PREFERRED EMBODIMENTS

Figure 1:
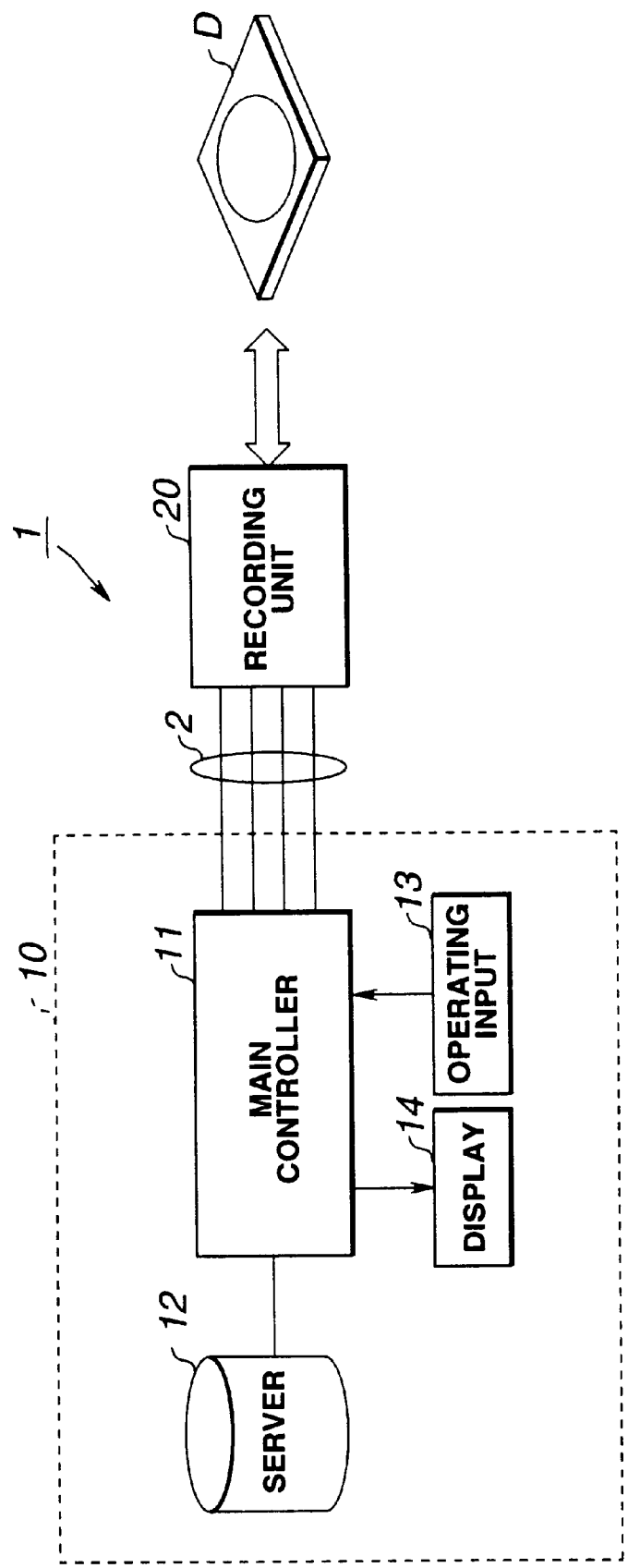
FIG. 1 is a block diagram of the overall dubbing system embodying the present invention.

Referring to the drawings, preferred embodiments of an audio dubbing system according to the present invention will be explained in detail.

FIG. 1 shows an audio dubbing system embodying the present invention. An audio dubbing system 1 has an audio transfer unit 10 including a main controller 11, a server 12, an actuating input unit 13 and a display unit 14, a recording unit 20 for recording audio data on a portable recording medium and a connection cable 2 for interconnecting the audio transfer unit 10 and the recording unit 20.

In this audio dubbing system 1, audio data is previously stored in a server 12 of the audio transfer unit 10, so that the user will select desired audio data from the audio data stored in the server 12 for recording on a recording medium.

That is, the present audio dubbing system 1 is such a system purveying musical contents to the user by recording audio data on a recording medium owned by the user, instead of purveying contents of audio data stored in a medium such as compact disc or audio tape. For example, this audio dubbing system 1 can be installed on a railroad station or a retail store to furnish the chargeable musical contents to the user or on a music studio for contents management purposes.

The schematics of the contents purveying system of the present audio dubbing system 1 are hereinafter explained.

In the server 12 of the audio dubbing system 1, musical contents of musical titles, each continuing for several minutes, such as top 100 titles of the latest hit chart, are stored as audio data. The user confirms the contents purveyed by the audio dubbing system 1 by a display 14 and, if he or she finds desired contents, he or she selects one or plural contents using the actuating input unit 13. The user loads the recording medium D on the recording unit 20 and actuates the actuating input unit 13 to initiate the recording.

If the user initiates the recording operation, the main controller 11 of the audio transfer unit 10 furnishes audio data of the contents designated by the user, from among the contents stored in the server 12, to the recording unit 20. The recording unit 20 records the audio data furnished from the audio transfer unit 10 in a recordable area of the recording medium.

When the recording of audio data of the contents desired by the user comes to a close, the audio dubbing system 1 terminates the purveying of the contents.

Although the server 12 is included in the audio transfer unit 10 in FIG. 1, the server 12 can be installed in an information center located on a distant place and can be communicated with a unit which includes the main controller 11, the display unit 14, the actuating input unit 13, and the recording unit 20 using ISDN and phone line.

In the following description of the present audio dubbing system 1, it is assumed that the recording medium handled by the audio dubbing system 1 of the present embodiment is a magneto-optical disc which is a recordable and reproducible disc provided in the format termed a mini-disc (trademark).

This magneto-optical disc, termed the mini-disc, is a disc-shaped recording medium approximately 64 mm in diameter, held in a cartridge, and can record approximately 74 minutes of stereo audio data using a Adaptive Transform Acoustic Coding (ATRAC) system. This magneto-optical disc, termed the so-called mini-disc, is herein referred to simply as an optical disc D.

Since the audio dubbing system 1 records the audio data compressed in accordance with the ATRAC system on the optical disc D, audio data of the contents stored in the server 12 are previously compressed in accordance with the ATRAC system. The audio data, compressed in accordance with the ATRAC system, is directly recorded on the optical disc D, without processing the audio data with decoding or encoding. The audio data compressed by the ATRAC system is referred to herein as ATRAC data. Thus, a connection cable 2 used fro transferring audio data from the audio transfer unit 10 to the recording unit 20 transfers the ATRAC data. It is noted that control commands or command data (Command) such as table-of-contents (TOC) data of the optical disc D are sent over the connection cable 2 in accordance with the transmission protocol which will be explained subsequently.

The format of data of the optical disc D used in the audio dubbing system 1 will now be explained.

Figure 2:
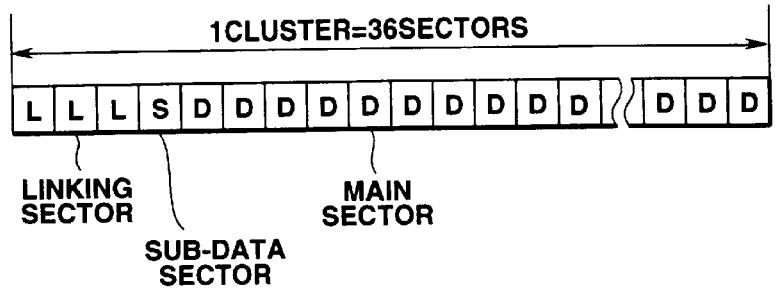
FIG. 2 shows the data structure on a magneto-optical disc embodying the present invention.

Data can be written on the optical disc D in units corresponding to an integer number times of a cluster, as shown in FIG. 2. It is noted that an audio signal of approximately 2.04 second is produced on reproducing the ATRAC data recorded in each cluster.

It is noted that each cluster is made up of 3 linking sectors, 1 sub-data sector and 32 main sectors for recording audio data compressed in accordance with the ATRAC system, the sum of which is 36 sectors. Each sector is a unit made up of 2352 byte data.

Since the format of the optical disc D uses an error correction system of the Advanced Cross Interleaving Reed Solomon Code (ACIRC) system, the linking sector is used as a sector allocated for completing the error-correcting interleaving within the cluster. That is, the linking sector is a waste sector for taking into account the interleaving in the error correction so that the data rewriting will be made on the cluster basis.

The sub-data sector is a reserve area.

Figure 3:
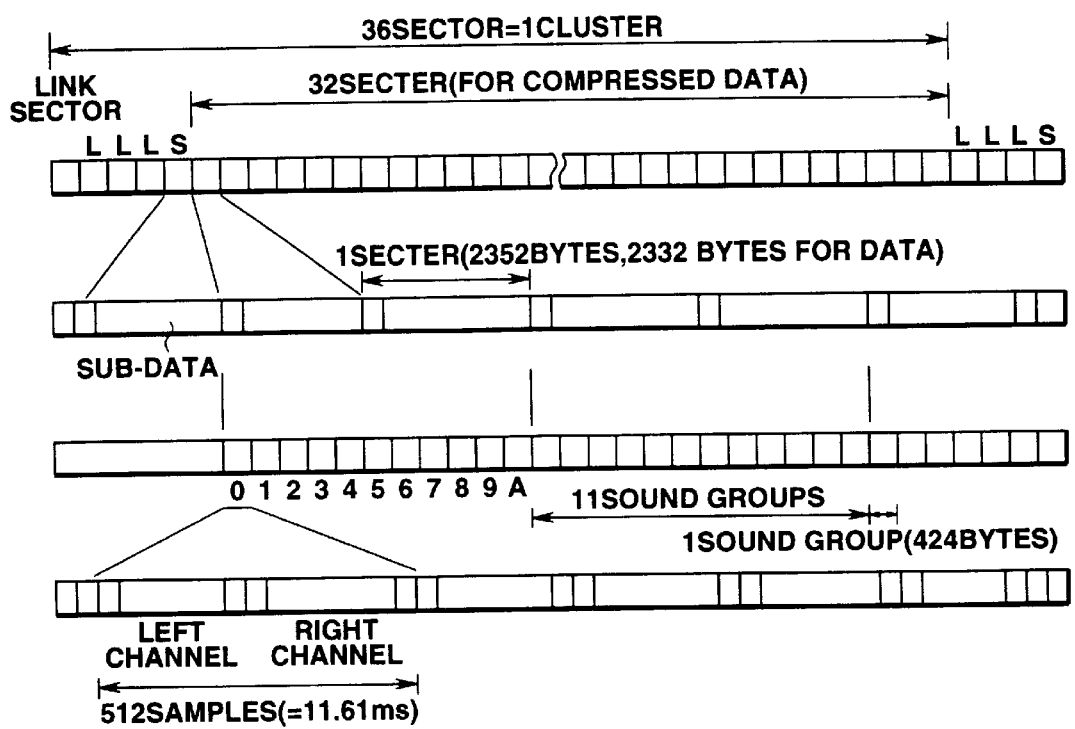
FIG. 3 similarly shows the data structure on a magneto-optical disc embodying the present invention.

The optical disc D handles 424 byte data compressed in accordance with the ATRAC system in units termed a sound group. This sound group allocates 212 byte data for each of the left and right channels. This sound group allocates 212 byte data for each of the left and right channels. On expansion, the sound-group-based compressed data corresponds to 512 samples of left and right channels. These 512 samples of data correspond to 2048 byte data, more specifically, 512 samples×16 bits×2 channels÷8 bits =2048 bytes. 11 of the sound groups make up two sectors, as shown in FIG. 3 .

The recording area of the optical disc D is split into a program area for recording audio data compressed in accordance with the ATRAC system, a User Table-Of-Contents (U-TOC) area as a management area for recording management data for managing audio data recorded in the program area, and a Pre-mastered Table-Of-Contents (P-TOC) area as a lead-in area.

In this optical disc D, musical numbers can be erased or edited by rewriting the U-TOC information instead of physically erasing the actual music data for rewriting. For example, in the case of the optical disc D having recorded thereon five musical titles, if a start address and an end address of a third musical title are specified as a recordable area, the third musical number cannot be reproduced. Thus, when recording the ATRAC data on the optical disc D, this U-TOC information needs to be re-written simultaneously. This U-TOC is explained hereinbelow. The unit of audio data recorded on the optical disc D is simply termed 'track'. This track is the unit of a musical title corresponding to the contents of the music purveyed by the above-described audio dubbing system 1.

The U-TOC of the optical disc D s made up of from U-TOC sector 0 to U-TOC sector 15, totaling 16 sectors. The U-TOC sector n, where n denotes 1 to 15, is indicated simply as U-TOCn.

FIG. 4 shows data recorded on the U-TOC0. the data recorded on the U-TOC0 is partitioned into bytes and represented as a slot for convenience. Each slot is specified by numerical figures from 0 to 587 on the ordinate in FIG. 4 by slot number of from 1 to 4 on the abscissa. The same applies for the U-TOC1 and so forth.

In the U-TOC0, there are recorded 12 byte header data followed by ClusterH and ClusterL specifying the address of the TOC0. In the TOC0, there are recorded a Maker code, specifying the maker of the optical disc D, a Model code, specifying the model of the optical disc D, FirstTNO specifying the track number of the first track of the optical disc D and LastTNO specifying the rack number of the last track, beginning from a slot 7×1. In the U-TOC0, Used Sectors specifying the use state of the sectors and DiscSerialNo specifying the serial number of the optical disc D are recorded in slot 8×4 and in slot 10×4, respectively.

In the U-TOC0, there are also recorded DiscID specifying the ID number of the optical disc D, a pointer P-DFA (Pointer for Defective Area) specifying the slot having recorded therein the start address of an area for recording the defective address information produced on the optical disc D, a pointer P-EMPTY (Pointer for Empty Slot) specifying the use state of a slot and a pointer P-FRA (Pointer for Freely Area) specifying a slot having recorded therein the start address of an area used for managing the recordable area, beginning from a slot 11×1. In the U-TOC0, there is also recorded a pointer P-TNOn specifying the slot having recorded therein a start address of each track recorded on the optical disc D from a slot 12×2 to a slot 75×4, n specifying the track number of each track. Since 255 tracks can be provided on the optical disc D, n is an integer from 1 to 255.

In the U-TOC0, there are also recorded a start address and an end address of each track, link information Link-P and a track mode (Trackmode) from a slot 78×1 to a slot 587×4. In the U-TOC0, there are further recorded 255×4 slots for recording the start address and the end address. The start and end addresses are recorded in a slot associated with each track.

Therefore, the pointer recorded in each of the above-mentioned P-DFA, P-EMPTY and in P-FRA indicate a slot of a start address represented from the slot 78×1.

Figure 5:
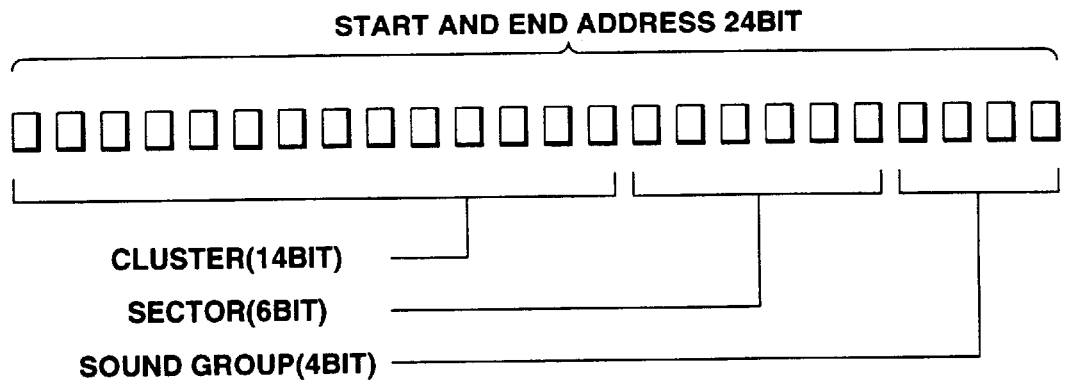
FIG. 5 shows the data structure of a slot on a U-TOC which is a management area on a magneto-optical disc embodying the present invention.

The above-mentioned start and end addresses are represented in 3 bytes=24 bits, as shown in FIG. 5. In the start and end addresses, a cluster address, a sector address and an address of the sound group are recorded in the first 14 bits, next 6 bits and the trailing 4 bits, respectively.

Figure 6:
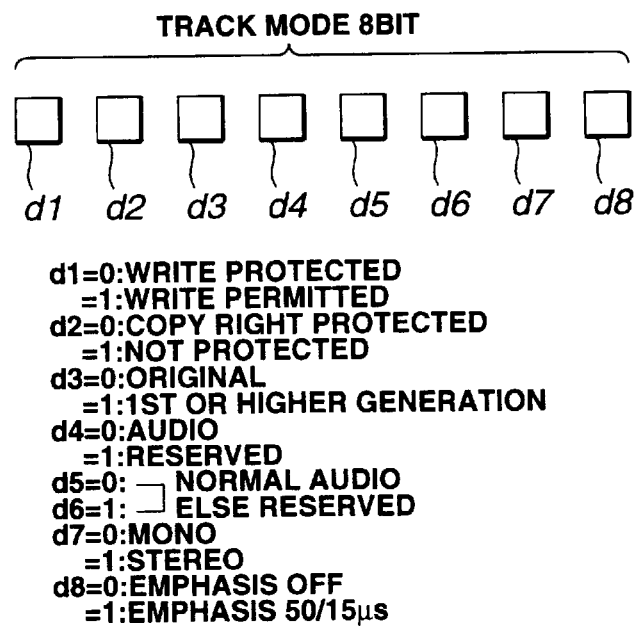
FIG. 6 shows the data structure of a track mode on a U-TOC which is a management area on a magneto-optical disc embodying the present invention.

The track mode (Trackmode) is represented by 1 byte=8 bit data, as shown in FIG. 6. In the track mode (Trackmode), the recording protect information, duplication protect information, generation information, audio information, erasure reserve information, monaural or stereo information and the emphasis information are recorded in the first bit, second bit, thirds bit, fourth bit, fifth and sixth bits, seventh bit and in the eighth bit, respectively. That is, the relevant information proper to each track is recorded in the track mode (Trackmode).

The link information P-Link is a pointer used for tracing from which start address the next data is recorded in case the same track is not recorded as a continuous data stream on the optical disc D, that is in case data of the same track is recorded discretely in the recording area of the optical disc. For example, if, in reproducing a track, data from the start address of the slot 586×1 needs to be reproduced next to the end address represented in the slot 78×1, the link information Link-P of the slot 80×4 specifies the slot 581×1.

That is, in the optical disc D, data need not necessarily be recorded on the recording medium, that is as a continuous data stream, but a sequential data string may be recorded discretely. If data is recorded discretely, data continuity is indicated by this link information P-Link, such that, by transiently storing read-out data in a memory during reproduction and by writing data in the memory at a quicker rate than the data read-out rate, continuous data can be reproduced without interruptions.

If data shorter than the recorded program is overwritten on the previously recorded data, efficient recording can be achieved by specifying the redundant area as a recordable area (P-FRA) without rasing the redundant area.

Figure 7:
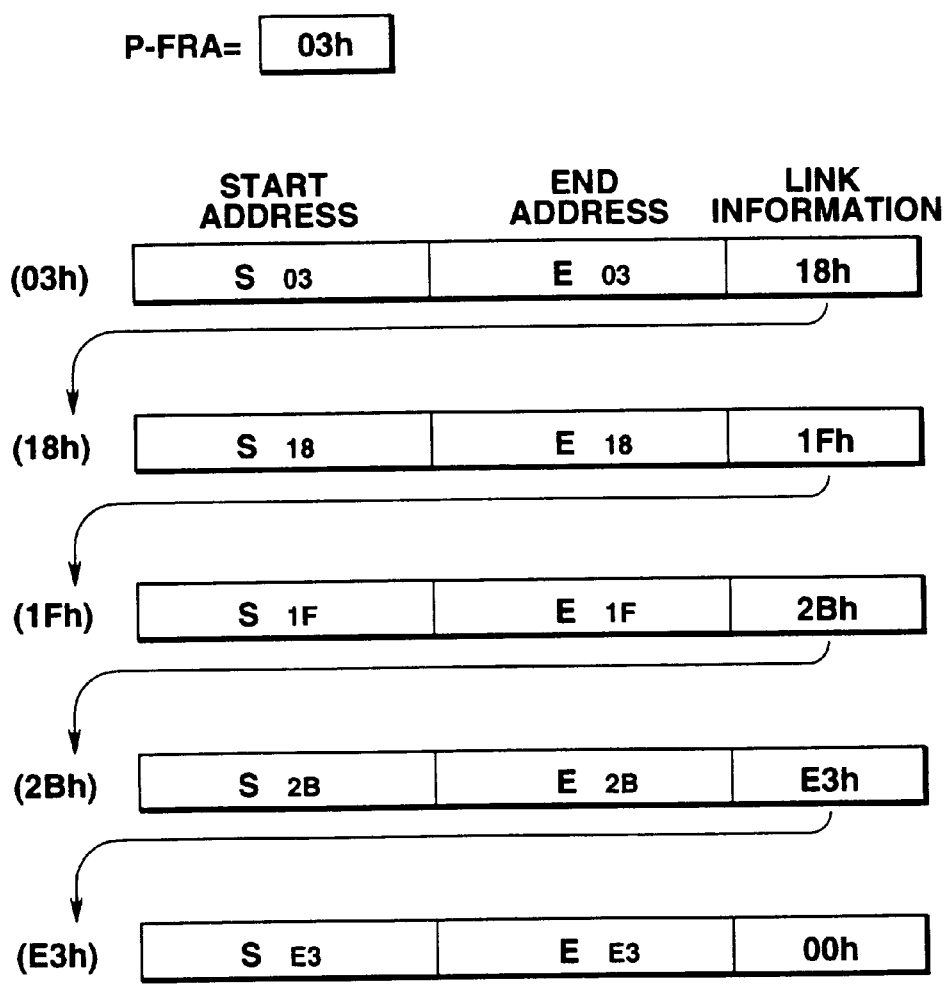
FIG. 7 is a diagrammatic view showing the linking state of each slot on a U-TOC which is a management area on a magneto-optical disc embodying the present invention.

The method for linking discrete areas is now explained with reference to FIG. 7 taking an example of the recordable area P-FRA.

The area specified by the start point address and the end point address of the slot 18h specified by the link information of the slot 03h can be judged to be a recordable area. Further, by tracing the slot 1Fh stated in the link information of the slot 18h, the area specified by the start point address and the end point address of the slot 1Fh can be judged to be a recordable area.

Further, by tracing the slot 2Bh stated in the link information of the slot 1Fh, the area specified by the start point address and the end point address of the slot 1Fh can be judged to be a recordable area. By tracing slot addresses recorded in the link information as described above, slots are traced until the link information is equal to 00h.

By tracing the slots beginning from a slot specified by P-FRA until the link information is equal to Null (=00h), it is possible to link on the memory plural fractional parts making up a track discretely recorded on the disc.

Although P-FRA is taken as an example for explanation, discretely present fractional parts can similarly linked for P-DFA, P-EMPTY and T-TNO)0 to 255.

FIG. 8 shows data recorded on the U-TOC1.

In the U-TOC1, the title of each track and title of the optical disc D in its entirety are managed.

If the recording track is audio data, the title of the optical disc D in its entirety and the title of each track correspond to the album title and the name of the performer and to the name of the musical title, respectively.

The letter information for each track is recorded in the slot specified by P-TNAn (n is 1 to 255), and if there are a large number of letters, the link information is used to connect plural slots for recording.

FIG. 9 shows data recorded on the U-TOC2.

In U-TOC2, the recording time and data for each program recorded in the program area is managed in the similar configuration to the above-mentioned U-TOC0.

FIG. 10 shows data recorded in the U-TOC4.

In U-TOC4, the title of each program recorded in the program area is managed in the similar configuration to the above-mentioned U-TOC0 so that the Japanese syllabic characters and kanji can be used as fonts of the entire title of the entire optical disc D.

Figure 11:
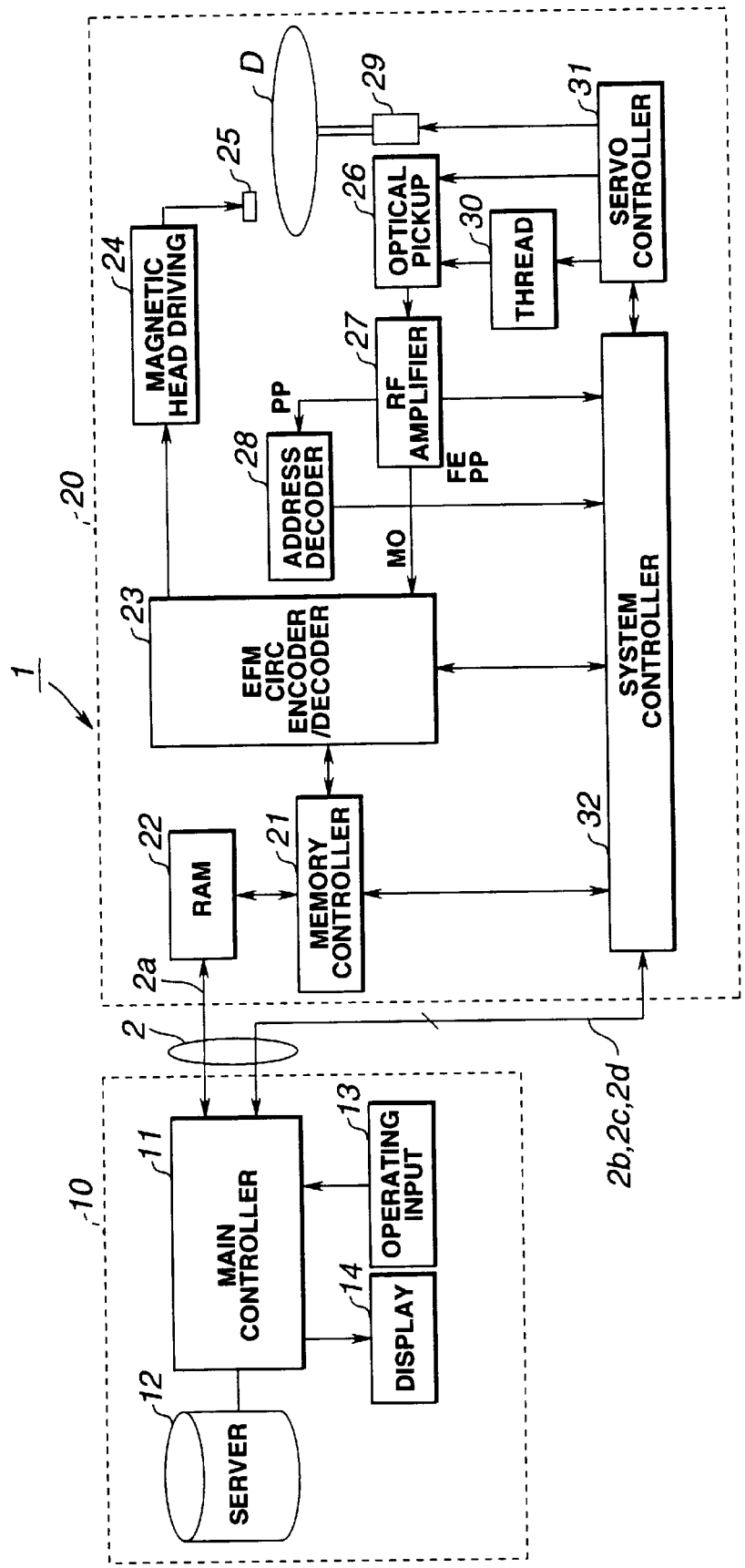
FIG. 11 is a detailed block diagram of a recording device shown in FIG. 1.

Referring to FIG. 11, the configuration of the audio dubbing system 1, added to with that of the recording unit 20 as described above, will be explained in detail.

FIG. 11 shows the block diagram of the audio dubbing system 1 embodying the present invention. This audio dubbing system 1 is made up of an audio transfer unit 10, recording unit 20 and a connection cable 2 interconnecting the audio dubbing system 1 and the recording unit 20. The audio transfer unit 10 has a main controller 11, a server 12, actuating input unit 13 and a display unit 14. The recording unit 20 is used for recording audio data in a portable type recording medium.

The recording unit 20 includes a Random-Access Memory (RAM) 22 for storing data sent from the audio transfer unit 10, and a memory controller 21 for controlling the RAM 22. The recording unit 20 also includes an encoding/decoding circuit 23 for decoding and encoding data and a magnetic head driving circuit 24 for driving a magnetic head 25 and an optical pickup 26 for illuminating the laser light on the optical disc D for detecting the reflected light. The recording unit 20 also includes a RF amplifier 27 for reproducing the Focusing Error signals (FE), Push-Pull signals (PP) and Magneto-optical playback signals (MO) from the reflected light detected from the optical pickup 26. The recording unit 20 also includes an address decoder 28 for reproducing signals corresponding to the wobbling of the groove formed in the guide groove of the optical disc D based on the Push-Pull signals (PP) from the RF amplifier 27 for decoding the ADIP and a spindle motor 29 for rotationally driving the optical disc D. The recording unit 20 further includes a thread unit 30 for radially moving the optical pickup 26 along the radius of the optical disc D.

The recording unit 20 includes a servo circuit 31 for controlling the focusing servo, thread servo and spindle servo based on the Focusing Error signals (FE) and the Push-Pull signals (PP) and a system controller 32 for controlling the memory controller 21, encoding/decoding circuit 23 and the servo circuit 31.

The optical pickup 26 illuminates the laser light on the optical disc D from the laser diode via an objective lens. The optical pickup 26 also detects the reflected light from the optical disc D by a photodetector to send the detection current to the RF amplifier 27.

The RF amplifier 27 generates the Focusing Error signals (FE), Push-Pull signals (PP) and the Magneto-optical playback signals (MO) based on the detection current from the photodetector. The RF amplifier 27 sends the generated Focusing Error signals (FE) to the servo circuit 30, while sending the Push-Pull signals (PP) to the address decoder 28 and the servo circuit 30, while sending the Magneto-optical playback signals (MO) to the encoding/decoding circuit 23.

The servo circuit 31 drives the objective lens via a biaxial unit of the optical pickup 26, based on the furnished Focusing Error signals (FE) and the Push-Pull signals (PP), in order to perform tracking and focusing servo control of the light beam radiated to the optical disc D. The servo circuit 31 drives a thread unit 30 based on the Push-Pull signals (PP) to perform thread servo control for driving the optical pickup 26 radially of the optical disc D. The servo circuit 31 performs spindle servo control of driving the spindle motor 29 to cause the optical disc D to be rotated at a Constant Linear Velocity (CLV) based on the spindle error signals from an optical disc rotation detection circuit, not shown.

The address decoder 28 regenerates the address information from the wobbled signals corresponding to the groove wobbling formed in the guide groove of he optical disc D.

The encoding/decoding circuit 23 converts the Magneto-optical playback signals (MO) from the RF amplifier 27 into bi-level signals and decodes the bi-level signals in accordance with the Eight-to-Fourteen Modulation (EFM) system while also decoding error correction in accordance with the Cross-Interleaved Reed-Solomon Coding (CIRC). The encoding/decoding circuit 23 appends error correction codes to the recording signals supplied from the memory controller 21 in accordance with the CIRC system and modulates the resulting signal in accordance with the EFM system to send the recording signal to the magnetic head driving circuit 24.

The magnetic head driving circuit 24 drives the magnetic head 25 based on recording signals from the encoding/decoding circuit 23 to apply a modulating magnetic field on the optical disc D by way of recording the recording signals.

The memory controller 21 controls the writing and readout of the ATRAC data to be stored on the RAM 22. This memory controller 21 causes the ATRAC data supplied from the audio transfer unit 10 transiently in the RAM 22 to send the transiently stored data subsequently to the encoding/decoding circuit 23.

The system controller 32 performs control of the recording unit 20 in its entirety. For example, the system controller 32 controls the memory controller 21, encoding/decoding circuit 23 and the servo circuit 31. The system controller 32 also controls the circuits adapted for exchanging control data with the audio transfer unit 10, as will be explained subsequently.

By the above structure, the recording unit 20 of the audio dubbing system records ATRAC data sent from the audio transfer unit 10 on the optical disc D.

The data exchanging method between the audio transfer unit 10 and the recording unit 20 of the audio dubbing system 1 will now be explained with reference to FIGS. 12A to 12C.

The audio dubbing system 1 has the connection cable 2 interconnecting the audio transfer unit 10 and the recording unit 20. The connection cable 2 is made up of an ATRAC line 2a for sending the ATRAC data as compressed audio data sent from the audio transfer unit 10 to the recording unit 20 and a Data Req line 2b for sending the ATRAC data request signal (Data Req) sent from the recording unit 20 to the audio transfer unit 10.

The ATRAC data corresponding to the contents stored in the server 12 are sent over the ATRAC line 2a from the main controller 11 of the audio transfer unit 10 to the memory controller 21 of the recording unit 20. Also, an ATRAC data request signal (Data Req) specifying a request of the ATRAC data is sent from the system controller 32 of the recording unit 20 over the Data Req line 2b to the main controller 11 of the audio transfer unit 10. That is, since the ATRAC data is transferred in terms of a pre-set volume as a unit, the recording unit 20 sends this request signal (Data Req) to the audio transfer unit 10 to make a request for the next data if all of the ATRAC data already transferred and written into he RAM 22 have been written in their entirety on the optical disc D. If the ATRAC data read into the RAM 22 have not been recorded on the optical disc D, the request signal to the audio transfer unit 10 is set to a transfer stand-by state.

Figures 12A, 12B, 12C:
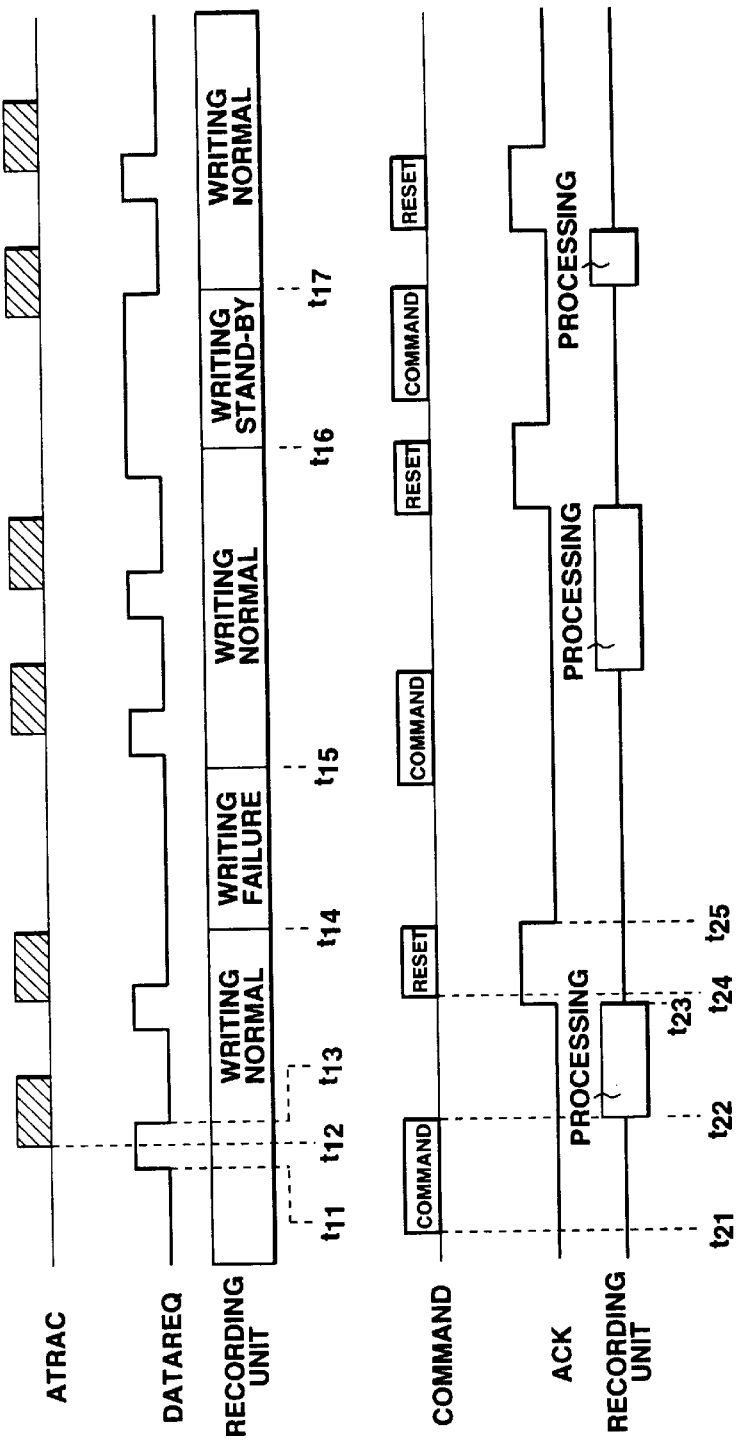
FIG. 12A is a block diagram showing the connecting state between an audio transferring unit 10 and a recording unit 20 according to the present invention.
FIG. 12B is a timing chart for illustrating compressed audio data ATRAC sent from the audio transferring unit 10 to the recording unit 20, a request signal Data Req sent from the recording unit 20 to the audio transferring unit 10 and the processing timing on the recording unit.
FIG. 12C is a timing chart for illustrating a command signal Command sent from the audio transferring unit 10 to the recording unit 20, an acknowledgment signal ACK sent from the recording unit 20 to the audio transferring unit 10 and the processing timing on the recording unit.

The time chart of FIG. 12B shows the relation between the ATRAC data and the request signal (Data Req).

If the recording state of the recording unit 20 is regular, the recording unit 20 sends the request signal (Data Req) at time $t_{11}$ to the audio transfer unit 10. When fed with the request signal (Data Req), the audio transfer unit 10 starts to supply the ATRAC data of a pre-set amount to the recording unit 20 at time $t_{12}$. When fed with the ATRAC data, the recording unit 20 halts the supply of the request signal (Data Req) at time $t_{13}$.

Also, if the recording state of the recording unit 20 is not regular, no request signal (Data Req) is sent from the recording unit 20 to the audio transfer unit 10, as indicated at time $t_{14}$ to $t_{15}$, so that no ATRAC data is transferred from the audio transfer unit 10 to the recording unit 20. If the request signal (Data Req) is not sent from the recording unit 20 for a pre-set time on end, the audio transfer unit 10 discontinues the recording operation.

The time domain from time $t_{15}$ until time $t_{16}$ specifies the time duration during which the supply of the ATRAC data to the recording unit 20 is normal.

If the request signal (Data Req) is sent as indicated from time $t_{16}$ until time $t_{17}$, but the ATRAC data is not sent for a pre-set time from the audio transfer unit 10, the recording unit 20 sets the data writing standby state, for example, the recording paused state, in order to await the ATRAC data. If the ATRAC data is sent, the recording unit 20 initiates the writing operation as indicated as from time $t_{17}$. If the writing standby state continues for a pre-set time on end, the audio dubbing system 1 judges that some trouble has occurred to discontinue the processing.

Thus, the audio dubbing system 1 can record ATRAC data reliably by the recording unit 20 issuing the ATRAC data request signal (Data Req) to the audio transfer unit 10.

The audio dubbing system 1 also has a command line COMMAND 2c for transferring the control command or other command data such as the TOC information supplied form the audio transfer unit 10 to the recording unit 20 and an ACK line 2d for transferring an acknowledgment signal (ACKNOWLEDGE) to the command data from the audio transfer unit 10 to the recording unit 20, as shown in FIG. 12A.

The TOC information generated by the main controller 11 of the audio transfer unit 10 or the command data such as data sizes of the ATRAC data of various contents are sent over the command line 2c to the system controller 32 of the recording unit 20. If the recording unit 20 has terminated the processing relevant to the command data, the acknowledgment signal (ACKNOWLEDGE) is sent over the ACK line 2d from the system controller 32 of the recording unit 20 to the main controller 11 of the audio transfer unit 10.

Specifically, the relation between the command data and the acknowledgment signal (ACKNOWLEDGE) is shown in the timing chart of FIG. 12C.

First, the audio transfer unit 10 sends pre-set command data at time $t_{21}$ to the recording unit 20. When the supply of the command data comes to a close, the recording unit 20 performs processing relevant to the supplied command data at time $t_{22}$. When the processing relevant to the supplied command data comes to a close, the recording unit 20 sends the acknowledgment signal (ACKNOWLEDGE) at time $t_{23}$ to the recording unit 20. On reception of the acknowledgment signal (ACKNOWLEDGE), the audio transfer unit 10 sends a reset command at time $t_{24}$ to the recording unit 20. On reception of the reset command, the recording unit 20 terminates the supply of the acknowledgment signal (ACKNOWLEDGE) at time $t_{25}$. If the command data has been supplied but the acknowledgment signal (ACKNOWLEDGE) is not supplied for a pre-set time from the recording unit 20, the audio transfer unit 10 deems that some trouble has occurred and accordingly interrupts the processing.

The following Table 1 shows command data supplied from the audio transfer unit 10 to the recording unit 20 over the COMMAND line 2.

TABLE 1

| command name | data of command (1 byte) | function |
|---|---|---|
| SETUP | 1 | set recording unit 10 to recording pause state |
| START | 2 | start recording |
| STOP | 3 | terminate processing |
| TOC0info | 4 | TOC0 information (track size and track mode) |
| ACK-RESET | 8 | ACK reset |
| ALRIGHT | 0b | recording state confirmed |
| Title | 83 | title information |

The setup command (SETUP) is a command for setting the recording unit 20 in the recording standby state, that is the recording pause state. On reception of the setup command (SETUP), the recording unit 20 is in the recording pause state. Specifically, this setup command (SETUP) is given as "01" data of 1 byte.

The start command (START) is a command specifying the recording start of the ATRAC data. On reception of the start command (START), the recording unit 20 initiates recording of the ATRAC data on the optical disc D. Specifically, this start command (START) is given as "02" data of 1 byte.

The stop command (STOP) is a command specifying the end of processing of the recording unit 20 relevant to the commands. On reception of the stop command (STOP), the recording unit 20 halts recording initiated by the start command (START). Specifically, this stop command (STOP) is given as "03" data of 1 byte.

The TOC0 information command (TOC0inf) is a command specifying the information recorded in the U-TOC sector 0 of the optical disc D. On reception of the TOC0 information command (TOC0inf) and the information on the track size and track mode next to the command, the recording unit 20 finds the recorded start and end addresses of the ATRAC data from the track size to record the TOC data in the U-TOC.

That is, the TOC0 information is inherently generated by the recording unit 20 itself so as to be recorded on the optical disc D. However, if ATRAC data of plural contents are supplied from the audio transfer unit 10, these data are sent as a continuous data stream to the recording unit 20, so that junction points between the contents cannot be distinguished and hence the track information cannot be generated. Therefore, the audio transfer unit 10 sends the track mode and the track size, indicating the data size specifying the data stream length of data corresponding to the respective contents, as the TOC0 information command (TOC0info). Based on the TOC0 information command (TOC0info), the recording unit 20 generates the TOC0 information to be recorded on the optical disc D.

Specifically, the track number TOC0 information command (TOC0info) is given as 1-byte "04" data.

The command (TNO) is a command specifying the track number of the ATRAC data to be recorded. On reception of the Track Number Command (TNO) and the track number next following the command, the recording unit 20 performs processing for the next following title command (Title) on the track number. Specifically, the Track Number Command (TNO) is given as 1-byte "05" data.

Th reset command (ACK-RESET) is a command for resetting the acknowledgment signal (ACKNOWLEDGE) supplied from the recording unit 20. When fed with the reset command (ACK-RESET), the recording unit 20 halts the supplying of the acknowledgment signal (ACKNOWLEDGE). Specifically, the reset command (ACK-RESET) is given as 1-byte "08" data.

The recording state confirming command (ALRIGHT) is a command for confirming the recording state of the recording unit 20. On reception of the recording state confirming command (ALRIGHT), the recording unit 20 sends the acknowledgment signal (ACKNOWLEDGE) to the audio transfer unit 10. Specifically, the recording state confirming command (ALRIGHT) is given as 1-byte "0b" data.

The title (Title) command is a command which furnishes the title information to be recorded in the TOC1 and TOC4 of the optical disc 4. Next to the title command (Title), the letter string information and character data are supplied. On reception of the letter string information and character data, the recording unit 20 records the title information for each track in TOC1 and TOC2 of the optical disc D. Specifically, the title command (Title) is give as as 1-byte "83" data.

The processing contents of the audio dubbing system 1 are explained with reference to a flowchart shown in FIG. 13.

Figure 13:
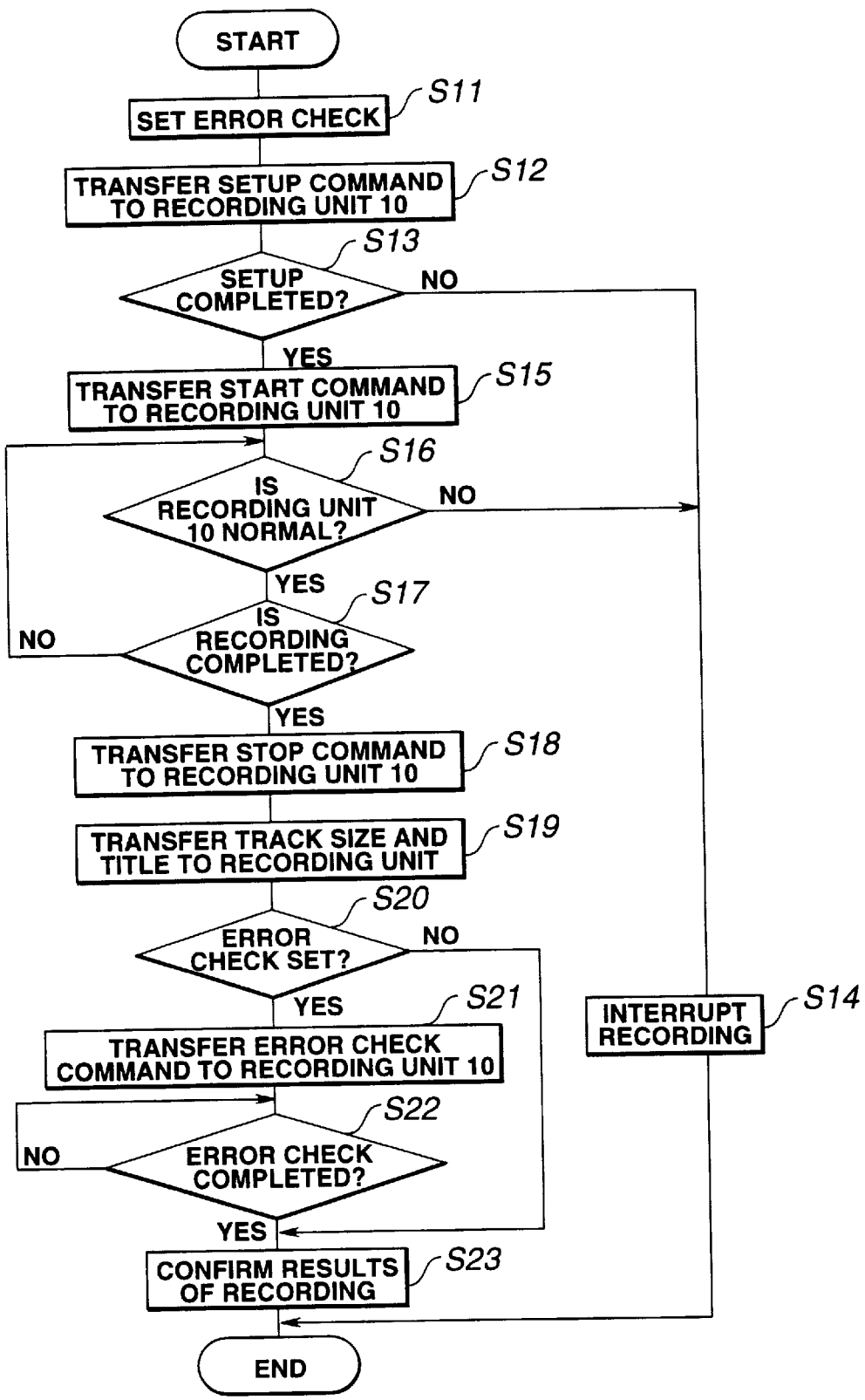
FIG. 13 is a flowchart for illustrating the dubbing processing by the recording unit 20 embodying the present invention.

When the user selects one or more contents to be recorded from the server 12 on the optical disc D and terminates the initial setting operations, such as loading of the optical disc D on the recording unit 20, the audio dubbing system 1 starts the processing as from step S11 shown in FIG. 13.

At step S11, the audio dubbing system 1 inquires the user whether or not an error check is to be performed by the display unit 14. If the user enters whether or not the error check is to be made using the actuating input unit 13, processing transfers to step S12. This error check will be explained in detail subsequently.

At step S12, the audio transfer unit 10 furnishes the setup command (SETUP) via a COMMAND line 2c to the recording unit 20. When the setup command (SETUP) is supplied from the audio transfer unit 10, the recording unit 20 sets the recording state on the optical disc D in the recording paused state and sends the acknowledgment signal (ACKNOWLEDGE) via ACK line 2d to the audio transfer unit 10. At step S13, the audio transfer unit 10 checks to see whether or not the acknowledgment signal (ACKNOWLEDGE) has been sent from the recording unit 20. If the acknowledgment signal (ACKNOWLEDGE) has been sent, processing transfers to step S15. If the acknowledgment signal (ACKNOWLEDGE) has not been sent for a pre-set time, processing transfers to step S14.

At step S14, the audio transfer unit 10 deems that recording on the optical disc D by the recording unit 20 is disabled by some trouble and displays an error message on the display 14 to terminate the processing.

At step S15, the audio transfer unit 10 sends the start command (START) over the COMMAND line 2c to the recording unit 20. On reception of the request signal (Data Req), the audio transfer unit 10 sends ATRAC data to the recording unit 20 every pre-set capacity. On reception of the ATRAC data, the recording unit 20 records data in the recordable area of the optical disc D.

Meanwhile, if plural tracks are designated by the user, that is if plural contents are designated, the audio transfer unit 10 sends the ATRAC data as a continuous data stream to the recording unit 20. The recording unit 20 also pre-stores the TOC information of the disc in the external memory or the like so that, if recording on the optical disc is not carried out regularly, the optical disc D can be restored to the pre-recording disc state.

If recording of the ATRAC data is started at step S15, processing transfers to step S16.

At step S16, the audio transfer unit 10, the audio transfer unit 10 sends the recording state confirming command ALRIGHT over the COMMAND line 2c to confirm the recording state of the recording unit 20. If the audio transfer unit 10 is fed from the recording unit 20 with the acknowledgment signal (ACKNOWLEDGE) and has confirmed that the recording state is normal, processing transfers to step S17 to confirm that the recording has come to a close. If the recording has not come to a close, processing reverts to step S16 to confirm whether or not recording has been performed regularly. That is, the processing of steps S16 and S17 confirms, at a pre-set interval, whether or not recording has been normal and whether or not recording has come to a close.

If it is deemed by the recording unit 20 that the recording has not been regular, processing transfers from step S16 to step S14 to interrupt the recording processing. At this time, the previous TOC information reserved in the external memory or the like is rewritten on the optical disc D for restoring the optical disc D to the pre-recording state.

If it is judged that the recording has come to a close, processing transfers from step S17 to step S18.

At step S18, the audio transfer unit 10 sends a stop command (STOP) over the COMMAND line 2c to the recording unit 20. On reception of the STOP command, the recording unit 20 terminates the recording of the ATRAC data. When the STOP command is fed at step S18, processing transfers to step S19.

At step S19, the audio transfer unit 10 furnishes the TOC0 information command (TOC0info), track size information, title command (Title), number of letters of the title and character data or the like necessary TOC information as well as Track Number Command (TNO).

On reception of the TOC information, the recording unit 20 records data from the U-TOC0 to the U-TOC4 of the optical disc D, based on the furnished TOC information. Meanwhile, the start address and the end address of each track are generated on the basis of the track size information supplied next to the TOC0 information command (TOC0info). That is, since the ATRAC data is furnished as a sole data stream, this data stream is divided from track to track into data sizes to generate the TOC information.

After furnishing the necessary TOC information at step S19, processing transfers to step S20.

At step S20, the audio transfer unit 10 judges whether or not the user has set for performing an error check at the previous step S11. If the user set for performing an error check, processing transfers to step S21 and, if otherwise, processing transfers to step S23.

At step S21, the audio transfer unit 10 sends an error check command over the COMMAND line 2c to the recording unit 20. On reception of the error check command, the recording unit 20 reads out the recorded ATRAC data to inspect whether or not there is any error in the recorded data.

When the error check by the recording unit 20 is started, the audio transfer unit 10 is in stand-by state at step S22 until the error check comes to a close. On termination of the error check, processing transfers to step S23.

At step S23, the audio transfer unit 10 displays the results of the test on the display unit 14. If the result of the error check has revealed that there is any error caused in the recorded data, the pre-recording TOC information reserved in, for example, the external memory, is recorded on the optical disc D.

After displaying the test results at step S23, the audio dubbing system 1 terminates the processing.

By processing from step S11 to step S23, the audio dubbing system 1 can positively record the ATRAC data on the optical disc D.

In the above-described processing from step S11 to step S23, the necessary TOC information is sent to the recording unit 20 after recording all of the ATRAC data. However, the audio dubbing system 1 can also send the TOC information before the audio transfer unit 10 sends the ATRAC data to the recording unit 20.

That is, the processing of step S19 is performed after terminating the setup and before sending the start command (START), that is between the processing at step S13 and that at step S15 Since the TOC information is recorded by the recording unit 20 after recording the ATRAC data on the optical disc D, the TOC information previously furnished needs to be stored in, for example, the external memory. By previously holding the TOC information in, for example, the external memory before recording the ATRAC information, the name of the musical number to be recorded can be displayed on the display unit.

It is also possible with the audio dubbing system 1 to furnish the TOC information in parallel at the same time as the audio transfer unit 10 is furnishing the ATRAC data to the recording unit 20.

That is, since the ATRAC data and the commands are sent separately over the ATRAC line 2a and over the COMMAND line 2c, the processing of steps S16 and S17 and that of step S19 can be carried out in parallel thus shortening the data transfer time. It is similarly necessary in this case for the recording unit 20 to save the TOC information in, for example, the external memory, so that the TOC information will be recorded on the optical disc D after recording all of the ATRAC data.

In the above-described processing from step S11 to step S23, the ATRAC data corresponding to plural contents are handled as a sole data stream and the information required for generating the TOC information is sent separately from the audio transfer unit 10 to the recording unit 20. However, when plural contents are specified by the user, it is also possible for the audio dubbing system 1 to record ATRAC data corresponding to a sole contents on the optical disc D, generate and record the TOC of the subsequently recorded ATRAC data and to record the ATRAC data corresponding to the further following contents.

The above processing can be realized by the processing from step S15 to step S19 constituting a loop repeated from one contents to another.

Specifically, the recording of two musical titles of the musical contents on the optical disc D is hereinafter explained by referring to a timing chart.

Figures 14A, 14B:
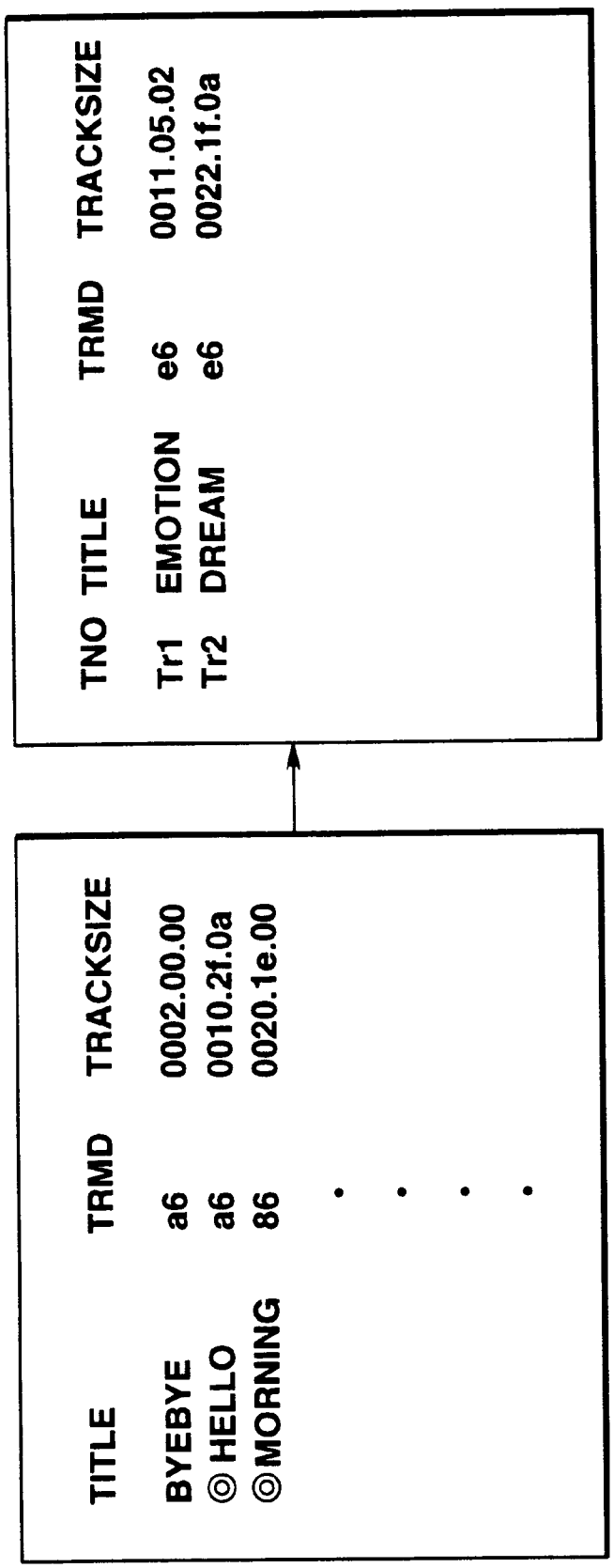
FIG. 14A shows the management information for the music program stored in a server embodying the present invention.
FIG. 14B shows the management information for the music program recorded on an optical disc D embodying the present invention.

Referring to FIG. 14A, there are stored in the server 12 first contents having a title "Bye-bye", a track mode (trmd) of "a6" and a track size of "0002.00.00", second contents having a title "Hello", a track mode (trmd) of "a6" and a track size of "0010.2f.0a" and third contents having a title "Morning", a track mode (trmd) of "86" and a track size of "0020.1e. 00".

On the optical disc D as a recording medium, there are recorded two musical numbers, namely a first track having the title "Emotion", a track mode (trmd) of "e6" and a track size "0011.05.02" and a second track having the title "Dream", a track mode (trmd) of "e6" and a track size "0022.1f.0a".

For recording the second contents (ATRAC data having the title "Dream") and the third contents (ATRAC data having the title "Morning"), indicated by ⊚marks in FIG. 14A, stored in the server 12, the processing is carried out as shown in FIGS. 15A to 15E, 16A to 16E, 17A to 17E and 18A to 18E.

FIGS.15A to 15E show a timing chart for command data between the audio transfer unit 10 and the recording unit 20 when transferring ATRAC data.

First, the recording unit 20 sends a setup command (SETUP) at time $t_{31}$ to the recording unit 20. On reception of the setup command (SETUP), the recording unit 20 sets up a recording caused state and furnishes the acknowledgment signal (ACKNOWLEDGE) at time $t_{32}$ to the audio transfer unit 10. On reception of the acknowledgment signal (ACKNOWLEDGE), the audio transfer unit 10 furnishes the reset command (ACK-RESET) to the recording unit 20 to reset the acknowledgment signal (ACKNOWLEDGE).

The audio transfer unit 10 furnishes at time $t_{33}$ a start command (START) to the recording unit 20. This furnishing of the start command (START) corresponds to the above-mentioned processing at step S15. On reception of the start command (START), the recording unit 20 starts the recording operation, at the same time as it furnishes the acknowledgment signal (ACKNOWLEDGE) and the request signal (Data Req) to the audio transfer unit 10.

Based on the request signal (Data Req), the audio transfer unit 10 starts supplying at time $t_{34}$ the ATRAC data of a pre-set capacity, that is the second contents (ATRAC data having a title "Hello" and the third contents (ATRAC data having the title "Morning"), to the recording unit 20. For furnishing ATRAC data every pre-set capacity, the audio transfer unit 10 sequentially furnishes the ATRAC data to the recording unit 20 based on the request signal (Data Req) supplied at time points $t_{35}$, $t_{36}$, $t_{37\ and\ t38}$ from the recording unit 20.

The audio transfer unit 10 furnishes the recording state confirming command (ALRIGHT) at a pre-set interval to check to see whether or not the recording state of the recording unit 20 is normal. This furnishing of the recording state confirming command (ALRIGHT) to see whether or not the recording state of the recording unit 20 is normal corresponds to the processing at the above-mentioned processing at step S16.

When the audio transfer unit 10 judges that all ATRAC data has been sent to the recording unit 20, it sends the stop command (STOP) at time $t_{39}$ to the recording unit 20. The processing of furnishing the stop command (STOP) corresponds to the processing at step S18. If the stop command (STOP) is furnished and the furnished ATRAC data in its entirety is recorded on the optical disc D, the recording unit 20 terminates the recording at time $t_{40}$ while furnishing the stop command (STOP) to the audio transfer unit 10.

FIGS. 16A to 16E show a timing chart of the TOC0 information command (TOC0info) sent at the above-mentioned step S20 from the audio transfer unit 10 to the recording unit 20. FIGS. 16A and 16B show a time chart of data sent from the audio transfer unit 10 to the recording unit 20 and a recording state of the U-TOC0 of the optical disc D at each time point.

It is assumed that the newly dubbed musical number is provisionally registered in the U-TOC as the third track next to the previously recorded first and second tracks.

At a time point $t_{51}$, when no TOC0 information command (TOC0info) is supplied, there are recorded in the U-TOC0 of the optical disc D the start address, end address and the track mode of the previously recorded first and second tracks (tracks having the titles "Emotion" and "Dream") and the start and end addresses of the provisionally recorded third track.

The audio transfer unit 10 furnishes at time $t_{52}$ the track mode and the track size of the first contents. That is, the audio transfer unit 10 furnishes, along with the TOC0 information command (TOC0info), the number of the contents of the ATRAC data having the title "Hello", the track mode of the contents and the track size of the contents.

On reception of the track mode and the track size of the first contents, the recording unit 20 generates the U-TOC0 information, based on the furnished information, to record the generated information on the optical disc D. Thus, at time $t_{53}$, the track mode, start address and the end address associated with the first contents are recorded in TOC0 of the optical disc D.

The audio transfer unit 10 then sends at time $t_{53}$ the track mode and the track size of the second contents. That is, the audio transfer unit 10 sends, along with the TOC0 information command (TOC0info), the contents number of the ATRAC data having the title "Morning", as well as the tack mode and the track size of the contents.

On reception of the track mode and the track size of the second contents, the recording unit 20 generates the U-TOC0 information based on the furnished information to record the generated information on the optical disc D. Thus, at time $t_{54}$, the track mode, start address and the end address associated with the second contents are recorded in the U-TOC0 of the optical disc D.

The audio transfer unit 10 sends at time $t_{55}$ a stop command (STOP). On reception of the stop command (STOP), the recording unit 20 judges that the processing corresponding to the previously furnished TOC0 information command (TOC0info) has come to a close and proceeds to the processing of deleting the surplus based on the assumption that there is no data downstream of the end address corresponding to the second contents.

Thus, at time $t_{56}$, there is recorded in the U-TOC0 of the optical disc D the track having the title "Hello" and the track having the title "Morning" in succession along with the previously recorded U-TOC0 data of the first and second tracks.

FIGS. 17A to 17D and 18A to 18D are time charts for the title information supplied at the above-mentioned step S20 from the audio transfer unit 10 to the recording unit 20. Meanwhile, FIGS. 17A and 18A show time charts of data furnished from the audio transfer unit 10 to the recording unit 20 and FIGS. 17B and 18B show the recording states of the U-TOC1 and 4 of the optical disc D at each time point.

Referring to FIG. 17D, there are recorded only the previously recorded titles of the first and second tracks in the U-TOC1 and U-TOC4 of the optical disc D at the time point $t_{61}$ when the title command (Title) is not supplied.

The audio transfer unit 10 sends at time $t_{62}$ the title of the first contents. That is, the audio transfer unit 10 sends the contents number of the ATRAC data number of letters supplied and letter data of the title "Hello" of the contents, along with the title command (Title).

On reception of the title of the first contents, the recording unit 20 generates the information of U-TOC1 and U-TOC4, based on the furnished information, to record the generated information on the optical disc D.

Meanwhile, if the number of letters of the title is larger than the prescribed value, processing is executed in plural installments. That is, if data for four letters only can be furnished, the four letters of "Hell" are first sent and the letter "o" is then sent at time $t_{64}$.

Thus, at time $t_{65}$, the title corresponding to the first contents is recorded on the U-TOC1 and U-TOC4 of the optical disc D.

The audio transfer unit 10 then furnishes the title of the second contents at time $t_{66}$ in FIG. 18D. That is, the audio transfer unit 10 furnishes, along with the title command (Title), the contents number of the ATRAC data, the number of letters furnished and the letter data of the title "Morning" of the contents. On reception of the second contents, the recording unit 20 generates the information of U-TOC1 and U-TOC4, based on the furnished information, in order to record the generated information on the optical disc D.

Thus, at time $t_{65}$, there is recorded on U-TOC1 of the optical disc D a title corresponding to the second contents.

When the recording unit 20 terminates the recording of all titles, the audio transfer unit 10 sends a stop command (Stop) at time t68 to terminate the processing.

By the above processing, the audio dubbing system 1 can record the TOC information on the optical disc D. That is, there can be recorded on the optical disc D the third track with the title "Hello", the fourth track with the title "Morning" recorded from the server 12 and the ATRAC information along with the previously recorded first track with the title "Emotion" and second track with the title "Dream".

With the audio dubbing system 1, as described above, the audio transfer unit 10 transfers the track size of each track along with the ATRAC data and the recording unit 20 splits the data stream recorded on the optical disc D to record the start address and the end address of each track on U-TOC of the optical disc D. This allows the audio dubbing system 1 to record efficiently the track selected by the user on the optical disc D. The recording unit 20 records the ATRAC data as a track responsive to the transferred data stream, while recording the start and end addresses of each track on the optical disc D in the style of splitting the data stream of this one track for improving the utilization efficiency of the optical disc D.

Referring to the drawings, an audio dubbing system according to a second embodiment modified from the above-described audio dubbing system 1 is explained. In explaining the audio dubbing system of the present second embodiment, the parts or components which are the same as those of the above-described audio dubbing system 1 are depicted by the same reference numerals and detailed description is omitted for simplicity.

Figure 20:
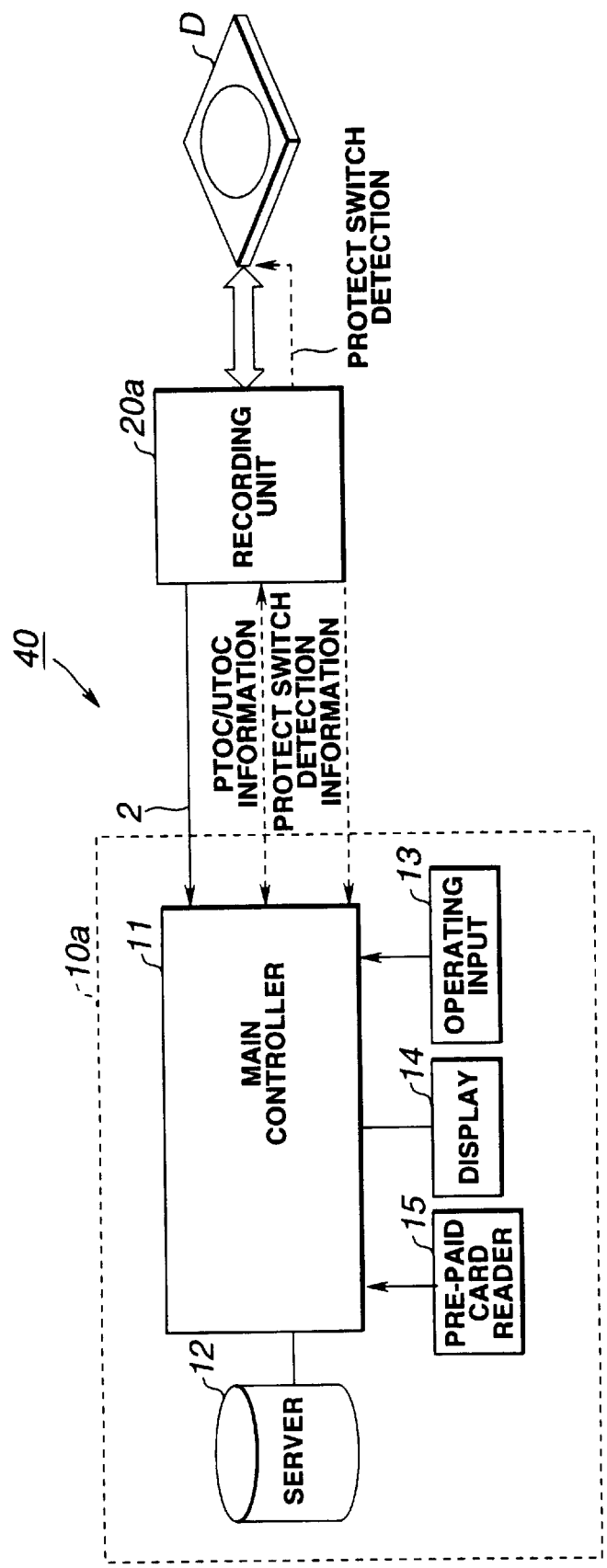
FIG. 20 is an overall block diagram showing a second embodiment of the present invention.

FIG. 20 is a block diagram for illustrating the audio dubbing system 40 of the present second embodiment.

Similarly to the preciously explained audio dubbing system 1, the present audio dubbing system 40 previous stores ATRAC data in the server 12 of an audio transfer unit 10a and selects ATRAC data desired by the user from the audio data stored in the server 12 to record the selected data on the recording medium.

The audio dubbing system 40 includes an audio transfer unit 10a, having a main controller 11, a server 12, an actuating input unit 13, a display unit 14 and a pre-paid card reader 15, and a recording unit 20a.

The pre-paid card reader 15 is a device for collecting the charges of the purveyed contents. If, for example, the present audio dubbing system 40 is installed on a store, the user inserts a pre-set pre-paid card to pay for the charges. The collection of amounts for the charges for the contents purveyed by the audio dubbing system 40 is not limited to that by the pre-paid card, but may also be by a variety of cards or cash. The pre-paid card reader 15 updates the charges of the pre-paid card based on this information. If the payment is made by cash, instead of by the pre-paid card, the rest is paid back to the user.

The recording unit 20a detects the status of a protection switch termed a mistaken recording inhibiting pawl. This protection switch is provided for preventing mistaken recording by the user. If the protection switch is set to non-recordable, the recording unit 20a cannot record audio data. If the protection switch of the optical disc D is set to non-recordable, the recording unit 20a furnishes the protection switch detection information to the main controller 11 of the audio transfer unit 10a.

The recording unit 20a also detects the PTOC information and the UTOC information of the optical disc. The recording unit 20a detects the type of the optical disc D, that is whether the optical disc D is the magneto-optical disc capable of recording/reproduction or the replay-only optical disc, by way of the PTOC information. The recording unit 20a also detects the vacant capacity of the optical disc D by way of the UTOC information. The recording unit 20a sends the information to the main controller 11 of the audio transfer unit 10a.

Figure 21:
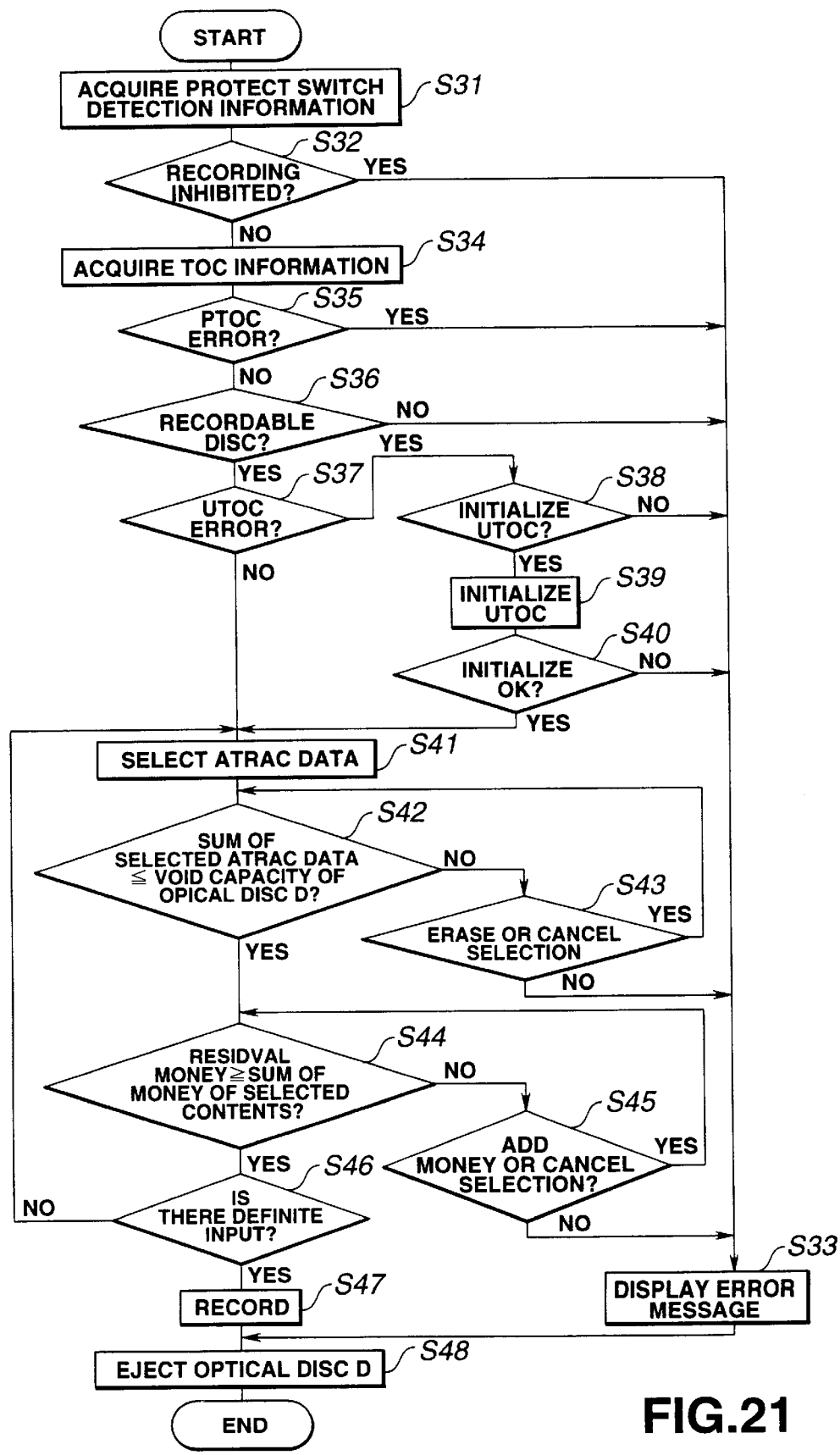
FIG. 21 is a flowchart for illustrating the confirming sequence prior to the recording operation by the recording unit 20.

The main controller 11 judges, based on the combination of the furnished protection switch information, PTOC/UTOC information and the charging information, whether or not the audio data transmitted from the server can be recorded as regularly on the optical disc D, before audio data is transmitted from the audio transfer unit 10a. If a judgment is given to the effect that the recording can be done as regularly, the ATRAC data is permitted to the transmitted from the audio transfer unit 10a. The sequence of error judgment is now explained using the flowchart of FIG. 21. When the optical disc D is inserted by the user, the main controller 11 of the audio dubbing system 40 performs the processing as from the step S31 before starting the recording of the ATRAC data.

At step S31, the main controller 11 acquires the protection switch detection information from the recording unit 20a. At the next step S32, it is judged whether or not the optical disc D is in the recording inhibiting state. If the optical disc D is in the recording inhibiting state, the main controller 11 proceeds to step S33 to display an error message. If the optical disc D is not in the recording inhibiting state, the main controller 11 proceeds to step S34.

At step S34, the main controller 11 acquires the PTOC information and the UTOC information of the optical disc D furnished from the recording unit 20a. At the next step S35, the main controller 11 judges whether or not the PTOC information can be read out as regularly. If the PTOC information cannot be read out, the optical disc D cannot record data. Thus, the main controller 11 proceeds to step S33 to display an error message. If the PTOC information can be read out, the main controller 11 proceeds to step S36.

At step S36, the main controller 11 judges, based on the PTOC information, whether or not the inserted optical disc D is a recordable optical disc. If the disc is a non-recordable disc, the main controller 11 proceeds to step S33 to display an error message. If the optical disc is a recordable disc, the main controller 11 proceeds to step S37.

At step S37, the main controller 11 judges whether or not the UTOC information can be read out as regularly. If the UTOC information can be read out as regularly, the main controller 11 proceeds to step S41. If the UTOC information cannot be read out as regularly, the main controller 11 proceeds to step S38 to display a message for the user as to whether or not the optical disc D is to be initialized. The reason is that, if the UTOC information cannot be read out, there is a possibility that the UTOC may be re-set to a normal state by initializing the optical disc D. If a request for initialization is made by the user, the main controller 11 initializes the optical disc D at step S39 to proceed to step S40. If there is made no request for initialization from the user, the main controller 11 proceeds to step S33 to display an error message.

At step S40, the main controller 11 judges whether or not the optical disc has been initialized successfully. If the result of judgment is affirmative, the main controller 11 proceeds to step S41 and, if otherwise, the main controller 11 proceeds to step S33 to display an error message.

At step S41, the main controller 11 invites the user to select the ATRAC data to be recorded on the optical disc D. That is, the main controller 11 causes the display unit 14 to display the contents stored in the server 12 to invite the user to designate the contents by the actuating input unit 13 based on the indication. When the user has selected the audio data for recording, the main controller 11 proceeds to step S42.

At step S42, the main controller 11 compares the sum of the capacities of the selected ATRAC data to the vacant capacity of the optical disc D. If the sum of the capacities of the selected ATRAC data is less than the vacant capacity of the optical disc D, the main controller 11 proceeds to step S44. If the sum of the capacities of the selected ATRAC data is larger than the vacant capacity of the optical disc D, the main controller 11 proceeds to step S43.

At step S43, the main controller 11 invites the user to judge whether or not any of the plural selected ATRAC data is not to be stored, or whether or not any of the ATRAC data already recorded on the optical disc D is to be erased. If the user judges that any of the plural selected ATRAC data is not to be recorded, the main controller 11 compares the sum of the ATRAC data excluding the ATRAC data judged not to be recorded with the vacant capacity of the optical disc D. If the user judges that any of the ATRAC data already recorded is to be erased, the main controller 11 compares at step S42 the sum of the selected ATRAC data with the vacant capacity of the optical disc D inclusive of the ATRAC data which should be erased.

If the user judges at this step S43 that none of the recorded ATRAC data is to be erased, and that none of the ATRAC data already recorded on the optical disc D is to be erased, the main controller 11 proceeds to step S33 to display the error message.

At step S44, the main controller 11 compares the sum total of the charge of the selected contents to the rest, based on the rest information from the pre-paid card reader 15. If the rest is more than the sum of the charges of the selected contents, the main controller 11 proceeds to step S46.

If the rest is smaller than the sum of charges of the selected contents, the main controller 11 causes the display of the rest being in deficit at step S45 to invite the user to judge whether or not any of plural selected contents is not to be recorded, or whether or not the money is to be additionally deposited. If the user judges that any of the plural selected contents is not to be recorded, the main controller 11 compares at step S44 the sum total of charges of the contents exclusive of the contents judged not to be recorded with the rest. If the user judges that money is to be additionally deposited, the main controller 11 compares at step S44 the sum total of the charges of the selected contents with the rest. If the user at step S45 refrains from giving judgment as to whether or not any of the plural selected contents is not to be recorded or money is to be additionally deposited, the main controller 11 proceeds to step S33 to display an error message.

At step S46, the main controller 11 displays the ultimate confirmation. If the user desires to make re-selection based on this display, the main controller 11 proceeds to step 41. If the user makes a definitive input, the main controller 11 proceeds to step S47.

At step S47, a permit signal permitting delivery of the selected ATRAC data is transferred to the server 12 from which the ATRAC data is transferred to and recorded on the optical disc D. The ensuing recording processing is similar to that explained with reference to the audio dubbing system 1.

If, at step S43, the user judges that any of the ATRAC data recorded on the optical disc D is to be erased, the main controller 11 at step S46 records the ATRAC data from the server 12 on the optical disc D, while erasing the ATRAC data already recorded on the optical disc D.

If the recording processing at step S47 or the display processing for error message at step S33 comes to a close, the optical disc D is ejected at step S48 to terminate the processing.

The ATRAC data is recorded positively by the main controller 11 performing the processing from step S31 to step S48.

Meanwhile, in the error message display processing at step S33, the display contents can be modified depending on the error contents. For example, if the protect switch of the optical disc D is in the recording inhibiting state, a message reading: "Disc is in Recording inhibiting State" may be displayed. If the PTOC information cannot be read out, or if the replay-only optical disc is loaded, a message reading: "Disc is Likely to be in Disorder" or a message reading: "This disc is Replay-Only" may be displayed, respectively.

With the audio dubbing system 40, as described above, it can be displayed before recording on the optical disc D whether or not the recording can be done correctly, thus enabling audio data to be recorded positively. Also, with the present audio dubbing system 40, since the display corresponding to an error message can be made by the display unit 14, the user can accommodate the error contents in processing.

Although the foregoing description has been made for the case of recording audio data on a magneto-optical disc, the present invention may also be applied to recording of video data instead of audio data. The recording medium may also be a recording medium other than the magneto-optical disc.

Although the server 12 is provided in the audio transfer unit 10 in FIGS. 1 and 20, the server 12 may also be provided in an information center located in a remote place and interconnected with the audio transfer unit 10 using ISDN or an analog telephone circuitry. In this case, a block corresponding to the audio transfer unit 10 of FIG. 1 less the server 12 is unified with the recording unit 20.

In FIG. 20, the information concerning an artist, such as an image, furnished by the communication interface 44, may also be furnished from the server 12 located in the remote place.

What is claimed is:

1. A transmitting/receiving system comprising:
    a transmitter including:
        memory means for storing compressed data, and
        first transmitting means for transmitting selected compressed data selected by a user from said compressed data; and
    a receiver including:
        receiver means for receiving said selected compressed data transmitted by said transmitter,
        recording means for recording said selected compressed data on a recording medium,
        detection means for detecting recording inhibiting information of said recording medium before said selected compressed data is transmitted by said transmitter,
        display means for displaying an error message for informing a user that recording is inhibited based on a detection output from said detection means, and
        second transmitting means for transmitting a request for information to said transmitter if said recording medium is not inhibited based on said detection output from said detection means.

2. The transmitting/receiving system as claimed in claim 1, wherein said detection means includes comparison means for comparing a capacity of a recordable area of said recording medium with a capacity of said selected compressed data from said transmitter.

3. The transmitting/receiving system as claimed in claim 1, wherein said detection means detects erasure protection information of said recording medium.

4. The transmitting/receiving system as claimed in claim 1, wherein said detection means detects whether said recording medium is a read-only medium or a recordable medium.

5. The transmitting/receiving system as claimed in claim 1, wherein said recording medium has a program area and a management area, and said detection means detects whether said recording medium is recordable depending on management information reproduced from said management area.

6. The transmitting/receiving system as claimed in claim 1, further comprising:
    account balance detection means for detecting a balance of money in an account deposited by said user, wherein said display means displays for said user said balance of said account based on an output of said account balance detection means.

7. A data transmitting/receiving method comprising the steps of:
    detecting recording inhibiting information of a recording medium before compressed data is transmitted from a server;
    displaying an error message for advising a user that recording is inhibited based on a result of said step of detecting;
    transmitting means for transmitting a request for information to said server if said recording medium is not inhibited based on said result of said step of detecting;
    receiving said compressed data transmitted from said server; and
    recording said compressed data on said recording medium.

8. The data transmitting/receiving method as claimed in claim 7, further comprising the steps of:
    comparing a capacity of a recordable area of said recording medium with a capacity of said compressed data from said server.

9. The data transmitting/receiving method as claimed in claim 7, wherein said step of detecting detects erasure protection information of said recording medium.

10. The data transmitting/receiving method as claimed in claim 7, wherein said step of detecting detects whether said recording medium is a read-only medium or a recordable medium.

11. The data transmitting/receiving method as claimed in claim 7, wherein said recording medium has a program area and a management area, and said step of detecting detects whether said recording medium is a read-only medium or a recordable medium depending on management information reproduced from said management area.

12. The data transmitting/receiving method as claimed in claim 7, further comprising the steps of:
    detecting a balance of money in an account deposited by said user; and
    displaying an insufficient funds error message for advising said user of a deficit of said account based on detection of said balance of said step of detecting.

* * * * *